US012602758B1

(12) United States Patent
Boudreaux et al.

(10) Patent No.: US 12,602,758 B1
(45) Date of Patent: Apr. 14, 2026

(54) BUILDING LEAKAGE DETECTOR USING REFERENCE-FREE BACKGROUND ORIENTED SCHLIEREN PHOTOGRAPHY

(71) Applicant: UT-Battelle, LLC, Oak Ridge, TN (US)

(72) Inventors: Philip R. Boudreaux, Knoxville, TN (US); Singanallur Vaidyanathan Venkatakrishnan, Knoxville, TN (US); Emishaw D. Iffa, Knoxville, TN (US); Diana E. Hun, Lenoir City, TN (US); William Powell Partridge, Jr., Oak Ridge, TN (US); Gurneesh Singh Jatana, Knoxville, TN (US); Rui Zhang, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 354 days.

(21) Appl. No.: 18/377,580

(22) Filed: Oct. 6, 2023

Related U.S. Application Data

(60) Provisional application No. 63/452,741, filed on Mar. 17, 2023.

(51) Int. Cl.
*G06T 7/00* (2017.01)
*G06T 7/11* (2017.01)
(Continued)

(52) U.S. Cl.
CPC .............. *G06T 7/0002* (2013.01); *G06T 7/11* (2017.01); *G06T 7/248* (2017.01); *G06T 7/40* (2013.01);
(Continued)

(58) Field of Classification Search
CPC ......... G06T 7/0002; G06T 7/11; G06T 7/248; G06T 7/40; G06T 2207/10016; G06T 2207/30184
See application file for complete search history.

(56) References Cited

U.S. PATENT DOCUMENTS 9,842,404 B2    12/2017    Freeman et al.
10,169,847 B1    1/2019    Heineck et al.
(Continued)

OTHER PUBLICATIONS

Boudreaux et al. "Application of reference-free natural background-oriented schlieren photography for visualizing leakage sites in building walls." Building and Environment 223 (2022): 109529. (Year: 2022).*
Hargather et al. "Background-oriented schlieren visualization of heating and ventilation flows: HVAC-BOS." Hvac&R Research 17.5 (2011): 771-780. (Year: 2011).*
(Continued)

*Primary Examiner* — Katrina R Fujita
(74) *Attorney, Agent, or Firm* — Scully, Scott, Murphy & Presser, P.C.

(57) ABSTRACT

A non-invasive technique to measure exfiltration and infiltration (leakage) in buildings including a system and method employing RFN-BOS photography. Leakage through a building envelope can be visualized using RFN-BOS photography when the background has sufficient texture and the temperature difference between the leakage and ambient air is sufficient. Leakage can be detected when there is a temperature difference of as low as 12° C.-15° C. through CMU and brick claddings. A minimum $\Delta T$ detection limit can be reduced to 5° C. so that the RFN-BOS technique can be used through all climate zones, and use of a sufficiently textured cladding in which the contrast textural feature is at 1,650 or greater. If the cladding has insufficient texture, the system uses a projection system to first project a high contrasting image pattern on the cladding surface. Prioritized sealing of leaks is provided based on an order of their corresponding leak-ranking parameters.

32 Claims, 19 Drawing Sheets

(51) Int. Cl.
| | |
|---|---|
| *G06T 7/246* | (2017.01) |
| *G06T 7/40* | (2017.01) |
| *G01M 3/04* | (2006.01) |

(52) U.S. Cl.
CPC ..... *G01M 3/04* (2013.01); *G06T 2207/10016* (2013.01); *G06T 2207/30184* (2013.01)

(56) References Cited

U.S. PATENT DOCUMENTS

| | | | | |
|---|---|---|---|---|
| 12,033,357 | B2* | 7/2024 | Spears | G06V 10/454 |
| 2014/0340502 | A1 | 11/2014 | Freeman et al. | |
| 2016/0148363 | A1* | 5/2016 | Phan | G06T 7/001 |
| | | | | 348/142 |
| 2016/0266594 | A1* | 9/2016 | Kauffman | G06Q 50/06 |
| 2016/0284075 | A1* | 9/2016 | Phan | G06T 7/001 |
| 2018/0096482 | A1* | 4/2018 | Freeman | G06T 7/246 |
| 2019/0304078 | A1* | 10/2019 | Asrani | H04N 23/20 |
| 2021/0215925 | A1* | 7/2021 | Kim | G01M 3/226 |
| 2023/0177726 | A1 | 6/2023 | Spears et al. | |
| 2024/0003771 | A1* | 1/2024 | Langdale | G01M 3/005 |
| 2024/0134007 | A1* | 4/2024 | Feng | G01S 7/412 |
| 2025/0104206 | A1* | 3/2025 | Nakai | H04N 23/60 |

OTHER PUBLICATIONS

Kakillioglu et al. "Autonomous heat leakage detection from unmanned aerial vehicle-mounted thermal cameras." Proceedings of the 12th International Conference on Distributed Smart Cameras. 2018. (Year: 2018).*

Kolhe et al. "Density measurements in a supersonic microjet using miniature rainbow schlieren deflectometry." AIAA journal 47.4 (2009): 830-838. (Year: 2009).*

Walter et al. "IR building analysis with extraction of elements using image segmentation and RetinaNet." Buildings 13.1 (2022): 109. (Year: 2022).*

Bauknecht, A., et al., "Blade tip vortex detection in maneuvering flight using the Background Oriented Schlieren (BOS) technique", Journal of Aircraft, Apr. 2014 14 pages.

Haralick, R.M., et al., "Textural Features for Image Classification", IEEE Transactions on Systems, Man, and Cybernetics, Nov. 1973, pp. 610-621 vol. SMC-3, No. 6.

Xue, T., et al., "Refraction Wiggles for Measuring Fluid Depth and Velocity from Video", ECCV 2014, Part III, LNCS 8691, pp. 767-782.

InnovationQ+, "Summaries with Thumbnails", IP.com and IEEE, Sep. 28, 1993 to Nov. 18, 2025, 53 pages.

Office Action dated Feb. 11, 2026 received in U.S. Appl. No. 18/377,608, 17 pages.

* cited by examiner

| Background image | Background material | Contrast 330 | |
|---|---|---|---|
| | 10,000 1 mm diameter dots, randomly distributed | Horizontal: 4,049 Vertical: 5,075 | 301 |
| | 5,000 1 mm diameter dots, randomly distributed | Horizontal: 1,390 Vertical: 1,463 | 303 |
| | CMU | Horizontal: 2,378 Vertical: 2,697 | 336 / 306 |
| | Brick | Horizontal: 820 Vertical: 1,650 | 339 / 309 |
| | Vinyl | Horizontal: 192 Vertical: 943 | 342 / 312 |

300

400

| | | | | | | | | |
|---|---|---|---|---|---|---|---|---|

Displacement (# of pixels)

ΔT [°C]

500

| Cladding image | CMU | Brick | Vinyl siding |
|---|---|---|---|
| Crack width (mm) | 6 | 6 | 6 |
| Crack height (mm) | 203 | 57 | 105 |

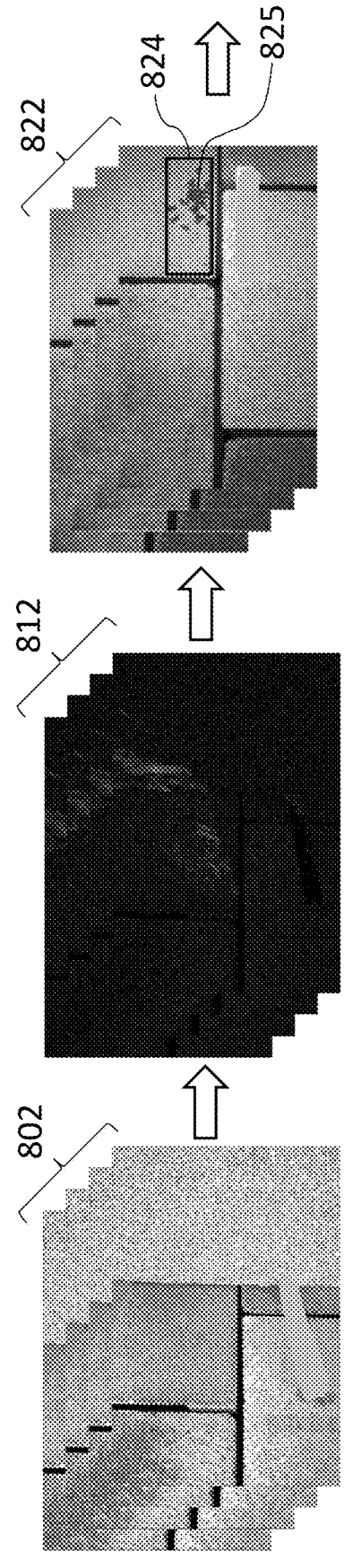
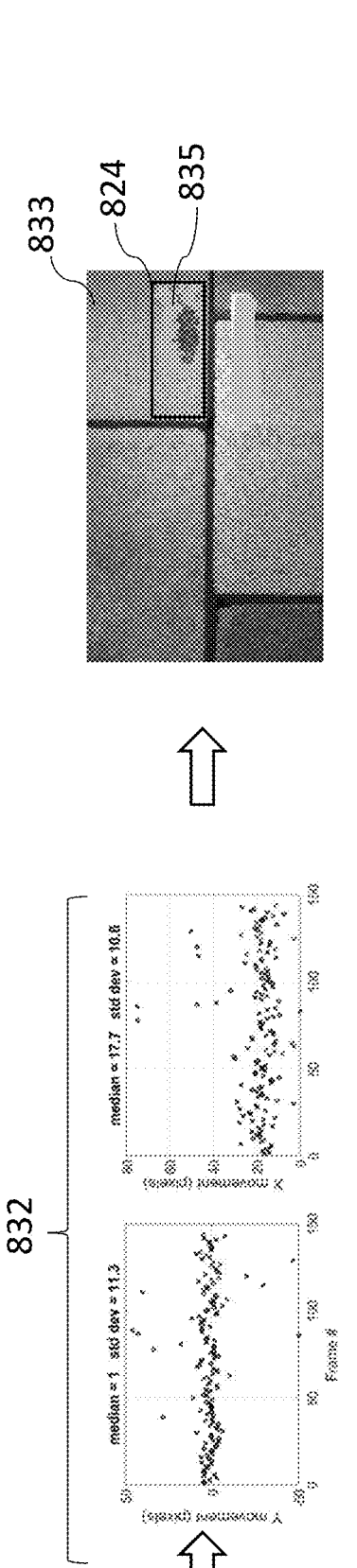
FIG. 10

1100

| Cladding type | Lighting condition | ΔT (°C) | Air flow (m/s) | Trial identification | Integration time (ms) |
|---|---|---|---|---|---|
| CMU | Direct sun | 0 | 0 | CMU_S_None | 0.9 |
| | Direct sun | 17.0 ± 2.0 | 0.56±0.11 | CMU_S_Low | 0.9 |
| | Direct sun | 34.0 ± 2.0 | 0.56±0.11 | CMU_S_High | 0.9 |
| | Cloudy | 0 | 0 | CMU_C_None | 12.9 |
| | Cloudy | 14.4 ± 2.0 | 0.76±0.11 | CMU_C_Low | 12.9 |
| | Cloudy | 40.6 ± 2.0 | 0.76±0.11 | CMU_C_High | 12.9 |
| Brick | Direct sun | 0 | 0 | Brick_S_None | 6.5 |
| | Direct sun | 14.8 ± 2.0 | 0.30±0.10 | Brick_S_Low | 2.6 |
| | Direct sun | 38.9 ± 2.0 | 0.46±0.11 | Brick_S_High | 6.5 |
| | Cloudy | 0 | 0 | Brick_C_None | 15.9 |
| | Cloudy | 15.6 ± 2.0 | 0.58±0.11 | Brick_C_Low | 15.9 |
| | Cloudy | 56.7 ± 2.0 | 0.58±0.11 | Brick_C_High | 15.9 |
| Vinyl siding | Direct sun | 0 | 0 | Vinyl_S_None | 4.2 |
| | Direct sun | 10.0 ± 2.0 | 0.76±0.11 | Vinyl_S_Low | 4.2 |
| | Direct sun | 30.0 ± 2.0 | 0.76±0.11 | Vinyl_S_High | 4.2 |
| | Cloudy | 0 | 0 | Vinyl_C_None | 13.0 |
| | Cloudy | 11.7 ± 2.0 | 0.73±0.11 | Vinyl_C_Low | 13.0 |
| | Cloudy | 34.4 ± 2.0 | 0.73±0.11 | Vinyl_C_High | 13.0 |

FIG. 16

BUILDING LEAKAGE DETECTOR USING REFERENCE-FREE BACKGROUND ORIENTED SCHLIEREN PHOTOGRAPHY

CROSS REFERENCE TO RELATED APPLICATION

The present application claims benefit of U.S. Provisional Application No. 63/452,741 filed on Mar. 17, 2023, all of the contents of which are incorporated herein by reference.

STATEMENT REGARDING FEDERALLY SPONSORED RESEARCH OR DEVELOPMENT

This invention was made with government support under project DE-AC05-00OR22725 awarded by the U.S. Department of Energy. The government has certain rights to this invention.

BACKGROUND

Air leakage in buildings can cause health and comfort concerns for occupants and can contribute to mold growth on building materials, or in extreme conditions, rot of building materials. Unwanted air leakage through the building envelope also contributes to approximately ~4 quadrillion Btu (1,172 TWh) of energy consumption per year in the building sector in the United States. Locating and sealing leakage sites can improve the energy efficiency, comfort, air quality, and moisture durability of the building stock.

Unwanted air leakage through walls and roofs further amounts to about 4% of the energy used in the United States. This leakage can cause health and comfort concerns for the building occupants and contribute to rot and mold growth in building materials. Locating and repairing leaks through the building envelope can improve the energy efficiency, comfort, air quality, and moisture durability of the building stock.

To reduce the energy consumption owing to air leakage, the leakage sites in the building envelope need to be located and sealed. Common methods for locating leak sites depend on the use of a blower door to determine the total air leakage characteristics of a building. A blower door is a large fan with speed control that maintains a pressure difference between the building with respect to the ambient outdoor environment. The volumetric flow rate of air through the fan is equal to the flow through the sum of the building leaks at that pressure difference according to ASTM E770. Measuring the flow at multiple pressure differences allows the building leakage to be characterized as a function of differential pressure, which follows the power law function. An infrared camera or smoke pencil can be used in conjunction with the blower door to locate leakage sites for repair as described in ASTM E1186, which is essential in jurisdictions with building codes that limit the maximum air leakage rate of building envelopes.

During a blower door test, an infrared camera is used to image the exterior or interior of the building. Areas of air leakage will be shown as a different temperature compared with the surrounding areas and have a characteristic feathering profile consistent with air leakage. The main drawbacks are that there is required a minimum indoor-to-outdoor temperature difference for the air leak to produce a significant change in temperature, and direct sunlight should not be present on areas of interest because this can hide the effect of the leak. Furthermore, when using infrared imaging, it can be difficult to distinguish between deficiencies in the building envelope's thermal barrier that are due to thermal bridges and air leaks. These drawbacks limit implementation.

Another approach is to use smoke in conjunction with a blower door. A smoke machine can be used to fill the building with smoke, after which the blower door is used to pressurize the building. From the exterior, smoke can be seen exfiltrating through the leaks. Alternatively, a smoke pencil can be used on the interior of the building while it is pressurized. This requires walking around the interior with the smoke pencil, watching for the smoke to travel to leakage points, which is extremely time-consuming. Both approaches usually require that the building be unoccupied because people may be adversely affected by smoke.

Other methods of locating building envelope air leak sites have been investigated but have not been developed and brought to market. Previous studies have visualized air leakage using holographic interferometry with a pulsed laser source to investigate leakage through a building envelope under wintertime conditions. An acoustic method has been implemented to find and measure leaks, and it requires equipment both inside and outside of the building and uses audible frequencies. The feasibility of using ultrasound technology to detect air leakage in buildings has been studied. Releasing aerosolized fluorescent B2 vitamins while a building is pressurized with a blower door to mark the air leak sites has also been explored.

The commercially available state-of-the-art methods for building air leak detection are intrusive to occupants, e.g., when smoke is used, and do not yield quantitative information in the case of smoke and infrared thermography.

SUMMARY

A refraction-based fluid flow imaging technique that can measure the leakage rate of individual air leaks from the inside or outside of a building.

An optical fluid flow imaging system and method using a reference-free natural Background-Oriented Schlieren (RFN-BOS) imaging for visualizing air exfiltration of a building structure, and particularly through common building claddings in an outdoor or indoor environment and that provides "direct" detection of leakage of a building structure that is less invasive/disruptive.

An optical fluid flow imaging system and method that noninvasively locates and measures exfiltration or infiltration sites of a building structure that makes use of the RFN-BOS technique to prioritize leak sealing via image segmentation or 3D schlieren imaging so that sealing efforts can be prioritized, e.g., sealing large leaks first.

The optical fluid flow imaging system and method for both visualizing and measuring transparent fluid flow characteristics and which can be applied to both locate and measure the velocity and volumetric flow rate of individual building air leakage locations so that individual leakage sites of a building structure can be prioritized for sealing.

The system and method enables BOS in an unobtrusive and/or stealth way, with backgrounds of insufficient texture, in dark and nighttime applications, and with tuned feature geometry and size to enhance BOS sensitivity.

Further, in an aspect, the system and method uses a light image/pattern projector to project a high-contrast background for use with digital-focusing schlieren photography and enables the RFN-BOS technique to detect building leakage against BOS-insensitive (i.e., low- or no-contrast) backgrounds.

In one aspect, there is provided a system for detecting leaks at a surface of a building structure. The system comprises: a video camera disposed at a predetermined distance from a surface of the building structure, the video camera capturing images of a surface of the building struc- ture; and a hardware processor associated with a memory storing program instructions in a computer system, the hardware processor running the program instructions con- figuring the processor to: detect, from the received image information, differences in light intensity at corresponding pixel locations in successive image frames; provide a visu- alization of an air flow movement based on detected differ- ences in light intensities at the corresponding pixel locations in successive images; identify and isolate one or more regions of interest within the air flow visualization, a region of interest (ROI) corresponding to a location indicating a potential leak at the surface of the structure; obtain one or more flow parameters characterizing the air flow movement within the ROI; and identify, based on the obtained one or more flow parameters, a location and magnitude of the potential leak at the surface of the building structure.

In a further aspect, there is provided a method of detecting leaks at a surface of a building structure. The method comprises: capturing, from a video camera device, a sequence of images, the video camera device disposed at a predetermined distance from a surface of the building struc- ture; detecting, from the received image information, using a hardware processor, differences in light intensity at cor- responding pixel locations in successive image frames; providing, using the hardware processor, a visualization of an air flow movement based on detected differences in light intensities at the corresponding pixel locations in successive images; identifying and isolating, using the hardware pro- cessor, one or more regions of interest within the air flow visualization, a region of interest (ROI) corresponding to a location indicating a potential leak at the surface of the structure; obtaining, using the hardware processor, one or more flow parameters characterizing the air flow movement within the ROI; and identifying, based on the obtained one or more flow parameters, a location and magnitude of the potential leak at the surface of the building structure.

In yet another aspect, there is provided a method for prioritizing a sealing of leaks at a surface of a building structure. The method comprises: capturing, from a video camera device, a sequence of images at a predetermined area of the surface of the building structure; processing the captured sequence of images to detect an air flow movement indicating a leak at the predetermined area of the surface of the building structure; for each detected air flow movement indicating a leak, determining a corresponding leak-ranking parameter of each air flow movement at the predetermined area; repeating the projecting, capturing, air flow movement detection processing, and corresponding leak-ranking parameter determining for each detected air flow movement at each of a plurality of different predetermine areas of the surface; determining, for all detected air flow movements at different predetermined areas, corresponding leaks having a largest corresponding leak-ranking parameter or volumetric flow rate and successively smaller leak-ranking parameters or volumetric flow rates; and prioritizing actions to seal leaks at locations at the surface in an order corresponding to leaks having the largest corresponding leak-ranking param- eter or volumetric flow rate and successively smaller leak- ranking parameters or volumetric flow rates.

A computer readable storage medium storing a program of instructions executable by a machine to perform one or more methods described herein is also provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 10 shows additional details depicting aspects of the alternative method 800 of FIG. 9;

FIG. 16 depicts a table listing the parameters for each of multiple tests for each of three different cladding material types.

DETAILED DESCRIPTION

Methods for visualizing and measuring transparent gases can be split into two broad categories: additive and refractive. Additive methods involve adding some substance to the gas that can be visualized. Using smoke to find leaks in a building is one simple additive method to visualize air leaks through building envelopes. Other additive methods include molecular tagging velocimetry, planar imaging, and digital particle image velocimetry. These methods require some additive to the gas, such as a phosphorescent or fluorescent material or other material that will flow with the gas and can be tracked by a detection system. In some cases, the additive material is the flow of interest, such as detecting gas plumes in air for the oil and gas industry. In this case, if the gas of interest has an absorption spectrum different than the surrounding air, an optical system can be developed, such as differential absorption lidar or tunable diode laser absorption spectroscopy, which can visualize and measure concentration or flow.

Figures 1, 2:
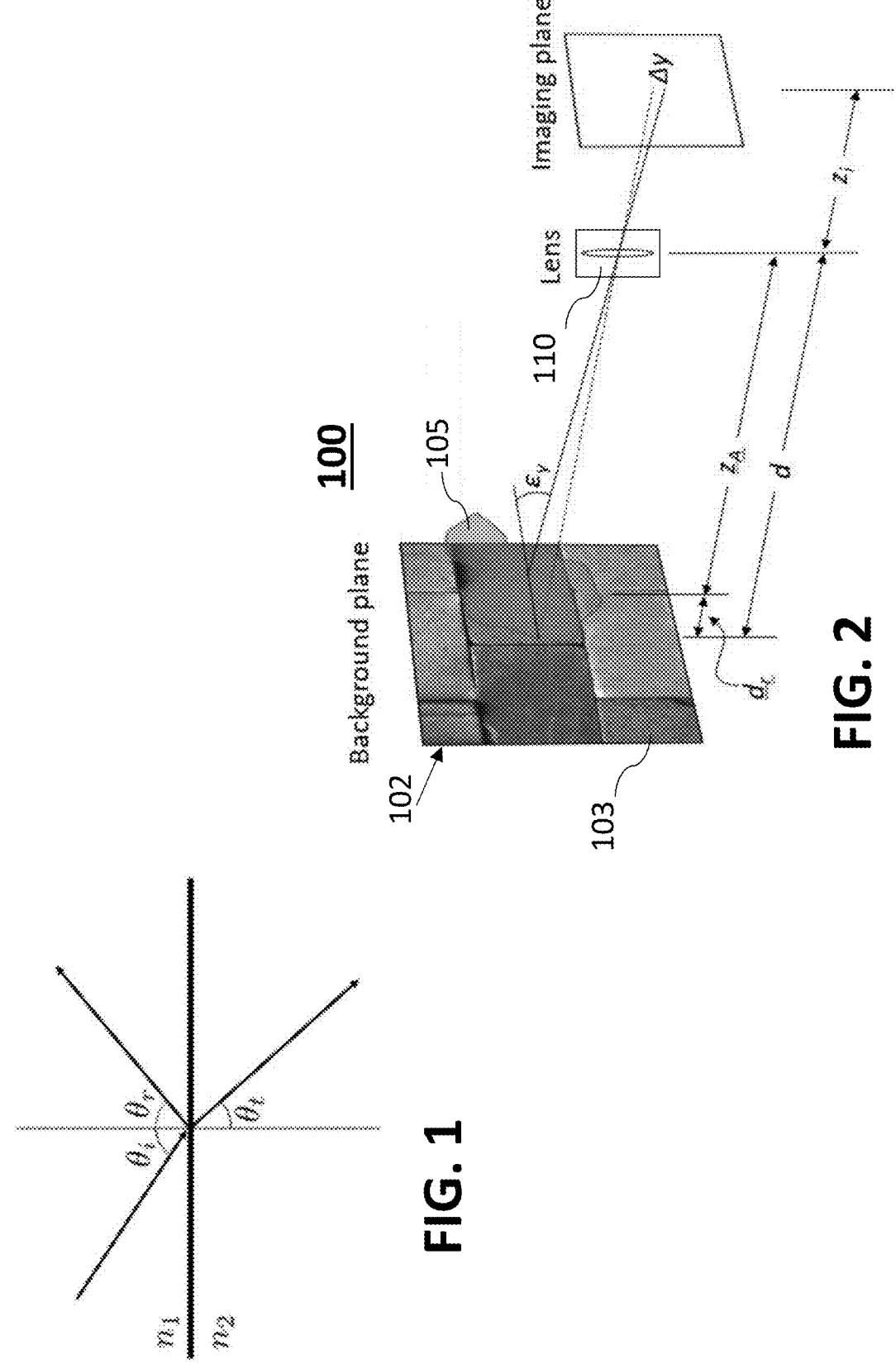
FIG. 1 is an illustration of Snell's Law wherein when light travels from one medium to another, the light changes speed and direction according to the refractive index of both media.
FIG. 2 depicts components of a BOS optical system according to an embodiment.

Refractive methods of visualizing and measuring gas flows work on the principle of refraction as described by Snell's law. Snell's law states that when light travels from one medium to another, the ratio of the refraction index of the media and the ratio of the sines of the incidence/transmission angles are constant and depend on the characteristics of both media. FIG. 1 and equations 1) and 2) describe this phenomenon, where n is the index of refraction, c is the speed of light in a vacuum, v is the speed of light in a medium, and $\theta_i$, $\theta_t$, and $\theta_r$ are the angles of incidence, transmission, and reflection, respectively.

$$n = c/v \qquad (1)$$

$$\frac{n_2}{n_1} = \frac{\sin\theta_i}{\sin\theta_t} \qquad (2)$$

For cases in which the gas flow of interest has a different index of refraction than the ambient gaseous surroundings, a visualization approach can be used that takes advantage of this phenomenon. The refractive index of a gas depends on its density. This is described by the Gladstone-Dale formulas, as shown in equation 3), where $\rho$ is the density of the gas, and K is the Gladstone-Dale constant, which depends on the gas or gas mixture and the wavelength of light passing through the gas.

$$n - 1 = K\rho \qquad (3)$$

Refractive methods of visualizing and measuring transparent fluid flows include shadowgraphy, schlieren photography, interferometry, and holography.

In one aspect, the system and method of the present application relates to a subset of schlieren photography called natural background-oriented schlieren (BOS) photography which method allows a refractive fluid to be visualized based on the distortion of a background with sufficient texture and contrast viewed through the fluid of interest. BOS is a known technique for imaging transparent refractive flows and has been applied to study flow parameters including structure (e.g., vortices), extent, and velocity or volumetric flow. The measurement is based on how the refractive object creates apparent displacement of background patterns.

FIG. 2 shows a BOS optical system 100 and in particular a BOS photography setup for a building structure used to detect fluid flow leak, e.g., a refractive fluid flow 105. In an embodiment, the fluid is air, e.g., an air flow at a different density and/or temperature than the ambient air outside of the building surface. In an embodiment, the density difference is provided by a temperature difference between the leak and the ambient air. In accordance with embodiments herein, the fluid (air) flow can be visualized with a temperature difference as low as 5° C. when using image subtraction.

In FIG. 2, the building is represented by a building cladding such as a high-contrast or textured material including, but not limited to brick or concrete masonry 102. Such high-contrast material is a material of a sufficient texture providing a high contrast background for image frame acquisition. Further shown is a video camera, a camera/lens device or any like imaging device 110 that can take successive bursts of digital images of the background surface. The video camera device/lens device 110 is located a predetermined distance, d, from the background surface 103. While the further away the video camera or camera lens is from the background surface 103 the higher the needed resolution. For example, when the video camera or camera lens 110 is located 1.0 m from the background a resolution of 2.3 megapixels (MP) is sufficient. In a non-limiting embodiment, and for illustrative purposes, the video camera 110 can be programmed to operate at about 300 frames per second (FPS), which can be sufficient to measure a 1m/s (fluid flow) leak velocity. For BOS photography, a small lens aperture is preferred to provide a large depth of field so that both the leak and background are in focus. Since the leak is relatively close to the background for this application this requirement is less stringent and a larger aperture could potentially be used. In an embodiment, the focal length is configurable and can depend on the photographic application.

In an embodiment, as shown in the BOS optical system 100 of FIG. 2, the distance d between the video camera device/lens device 110 and background surface 103 can range from between 0.25 m to 5 m or beyond. The distance between the refractive fluid 105 and the camera lens camera lens is zA and the distance from the camera lens 110 to the imaging plane is zi. The refraction angle of a light ray due to the refractive fluid is εy, and Δy is the displacement of the incident light ray on the imaging sensor due to the fluid. Further, $d_r$ is the distance from the background to the refractive fluid. In the optical setup 100, the ratio $d_r$/d can be 0.5 which is optimal for flow visualization; however, a $d_r$/d value of ~0.1 is used for detecting building leakage BOS when the camera 110 is used within 1.0 m from the background.

In operation, the refractive flow 105 is situated between a background surface 103 with sufficient contrast and the video camera or digital camera 110. For standard or reference BOS, the digital camera 110 records a reference frame without flow and a frame with flow. These images are compared, and based on distortions of the background, optical flow techniques are used to visualize and even measure the flow. A translation vector of the background feature is calculated from the difference in the two images and correlates to the refractive fluid motion.

Different BOS methods include pulsed illumination, retroreflective, high-framing-rate, velocimetry, color, natural background, reference-free, and free-surface BOS photography. Reference-free BOS photography does not require a reference image and can be implemented if the refractive fluid does not cover the entire field of view. Since visualizing air leaks against wall claddings lends itself to natural-background BOS photography and using reference-free BOS photography enables air leak detection without the need for a reference frame with no leakage, combining these two methods is appropriate for imaging and measuring air leakage. This combined method is referred to herein as reference-free natural BOS (RFN-BOS) photography.

To extract flow information from BOS techniques, sequential frames of video are analyzed to track objects or refractive features for motion. Detection and tracking of features in videos are tasks that are carried out using optical-flow algorithms. The main concept behind optical flow is to detect an object consisting of a group of pixels that are similar across neighboring frames and assign a motion vector that corresponds to the object or refractive feature velocity. Different techniques can be used to identify similar pixels between frames, and the most widely used methods rely on the pixel intensity values (i.e., brightness constancy) and a local search window to determine the motion vectors. Using high-frame rate, low-noise sensors and signal processing algorithms, the system is able to image tiny sub-pixel motions from video data.

In an embodiment, as air is typically transparent, when using optical flow algorithms to directly detect movement of air leaks, the change in intensity alone cannot be used to detect the motion. Thus, an approach is implemented that relies on identifying the distortions in the background due to motion of the transparent fluid by using two stages of a modified optical flow method. In an embodiment, this algorithm is used to image movement of hot air in various scenarios. It is the case that the RFN-BOS technique combined with this two-stage algorithm can visualize typical building leakage that has a velocity under 1 m/s and a temperature difference greater than 5° C. compared with ambient air.

Variables that influence the suitability of the RFN-BOS technique to visualize and measure air leakage in buildings include the texture and contrast of the background surface, or building cladding, the distance of the exfiltration from the cladding, the temperature difference between the exfiltration and outside air, and the optical system parameters such as frame rate, camera resolution, pixel size, and focal length.

The quality of background needed for the BOS technique is impacted by color, depth and contrast of the background building cladding. For example, for low-contrast backgrounds such as vinyl sidings, the optical system will require the use of a developed pattern projection system to project a random or structured pattern on the building cladding during image frame acquisition. In an embodiment, a random dot pattern can be created by splashing droplets of paint on a surface.

As known, texture is an innate property of virtually all surfaces and can be fine, course, or smooth rippled, molled, irregular, or lineated. Texture contains important information about the structural arrangement of surfaces. A quality indicator or metric can be used to assess the applicability of a background surface texture for BOS. One such quality indicator or metric for texture determination is described in the reference to R. M. Haralick et al. entitled Textural Features for Image Classification (I.E.E.E. Transactions on Systems, Man and Cybernetics, Vol SMC-3, No. 4, November 1973). In an embodiment, a quality indicator or metric is used for determining background contrast quality and to assess the applicability of a background for BOS. This metric involves calculating adjacent pixel contrast in an image of a background. Quantifying texture in images by comparing pixels or groups of pixels with adjacent pixels can be used in an embodiment. Further, contrast can be described for an image in mathematical terms if an image is made up of an array of x-y data with ≥8-bit grayscale intensity associated with each element in the array.

Figure 3:
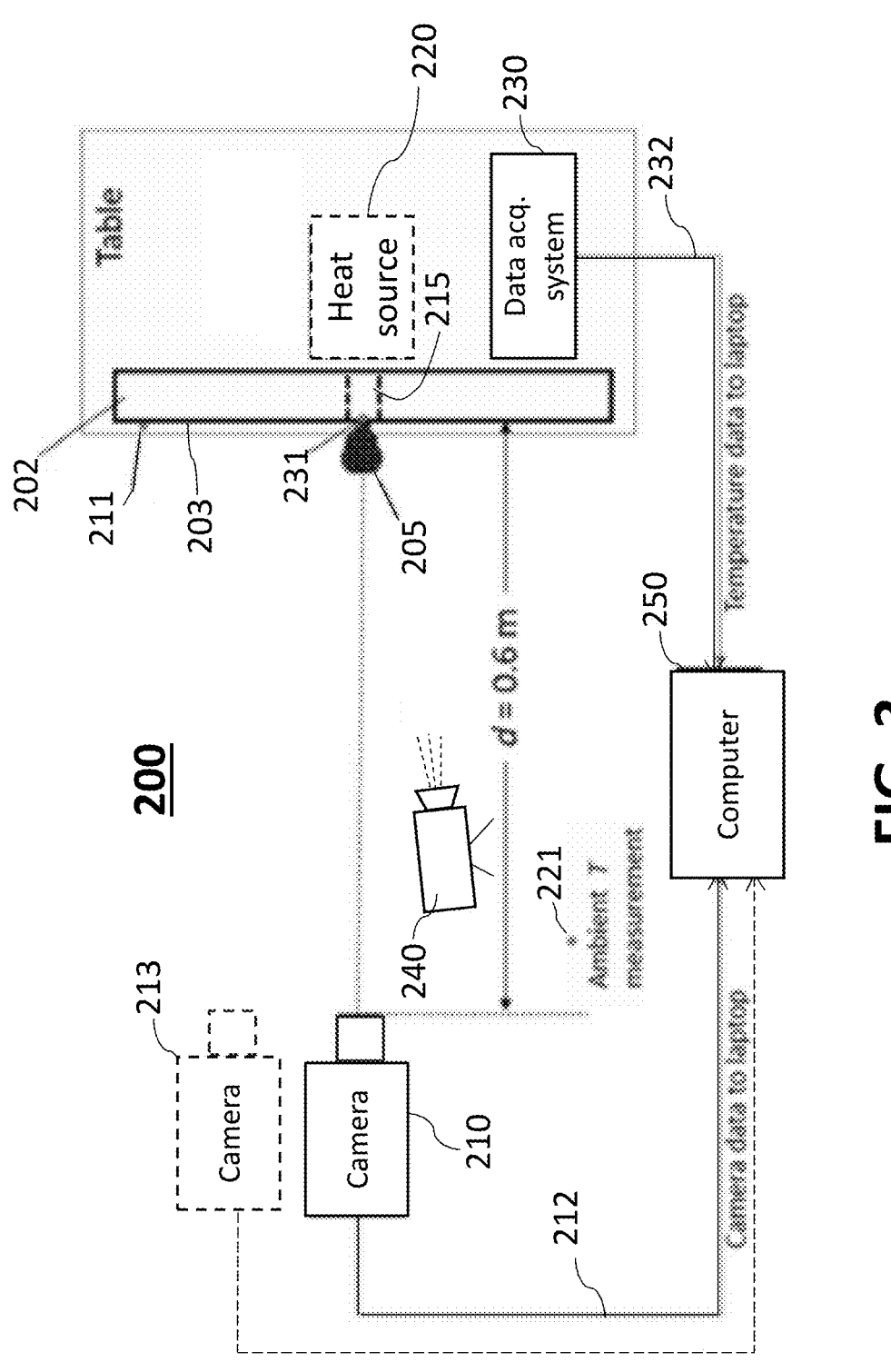
FIG. 3 depicts an RFN-BOS optical system for conduct- ing exfiltration measurements that includes a camera ori- ented normal to a building cladding in an embodiment.

FIG. 3 depicts a further embodiment of an RFN-BOS optical system 200. The system of FIG. 3 is implemented for measuring building exfiltration and could also be used for infiltration, the building including a cladding 202 with an opening, e.g., a crack. A heat source can provide heated air, for example, through the crack, as a surrogate for exfiltration. Exfiltration measurements using the system 200 of FIG. 3 were conducted with the camera oriented normal to the cladding.

More particularly, in the RFN-BOS optical system 200 of FIG. 3, there is provided a video camera 210 or like imaging sensor oriented normal to a building cladding (i.e., exterior wall cladding material) 202 and located a distance d from the building surface. In an embodiment, the distance d can range from several inches to 10 meters or greater, but the distance is not so limiting. In an embodiment, the distance d is approximately 0.6 m from the background to the camera. As shown, the building cladding includes a leakage opening such as a crack 215 that provides a location for air exfiltration 205 where air flow can leak. In an embodiment, the leaked air exfiltration 205 is of a different temperature than the ambient air by providing a heat source, e.g., a heater 220, on the inside of the building cladding at a location proximate the opening 215. The heat source 220 creates a temperature differential between the ambient air on the inside of the building or cladding, and ambient air external of the building cladding. The location 211 at the surface 203 of the cladding 202 as shown in FIG. 3 is a temperature T measurement location as is the location 221 inside the building on the other side of the cladding 202. The location 231 is a measurement location of an air exfiltration velocity, v, and/or temperature, T. A data acquisition system 230 such as a National Instruments CompactDAQ including temperature sensors (not shown) are provided to sense the ambient air 221 and provide temperature reading 232 to a computer system or like data processing device, e.g., a laptop 250. Camera device 210 provides camera data 212 to the computer system 250.

As shown in FIG. 3, in an alternate embodiment, an additional camera 213 can be setup as a stereo camera system to provide additional images of the building cladding surface for processing. Although not shown, in this embodiment, the two cameras 210, 213 are setup a short distance apart from each other to provide stereoscopic camera images. In such an embodiment, the two cameras 210, 213 are synchronized in time to each capture successive synchronized frames of the building surface. The cameras 210, 213 are synchronized to obtain a short stereo video of building cladding. The videos obtained from each camera can be analyzed for optical flow, which is intensity variations that can be tracked through each frame. In an embodiment, the optical flow from the captured frames can be converted to a velocity measurement when only one camera is used and can be converted to volumetric flow using a single camera or if synced stereo cameras 210, 213 are used.

In an illustrative use of the RFN-BOS optical system 200 shown in FIG. 3, five backgrounds were analyzed using the textural features. The backgrounds were imaged with the camera 210 and setup as shown in FIG. 3 and included two optimized random dot patterns, as well as three cladding types—concrete masonry unit (CMU), brick, and white vinyl siding. The random dot patterns were ideal for BOS and were created with a "makebospattern" function from the PIVMat Toolbox for MATLAB (e.g., PIVMAT Version 4.2). Inputs to the function were number and diameter of dots. As shown in FIG. 3, located at or proximate to the camera 210 is a projection system 240 that can first generate an image pattern, such as random dots or speckles, for projection upon the cladding surface 203 prior to leak detection sensing. As will be described in greater detail, any incoherent or coherent light image pattern projection system 240 that can project a random dot or speckle or other pattern to increase the apparent texture of the cladding surface 203 for air exfiltration detection can be implemented. ImageJ software for processing and analyzing scientific images can be used with a plug-in for computing the textural features.

The texture features for each image were determined for the horizontal and vertical directions since images can have directional texture features. For example, in an image consisting of horizontal lines, no contrast occurs along the horizontal direction, but contrast in the vertical direction does occur because the intensity changes.

Figure 4:
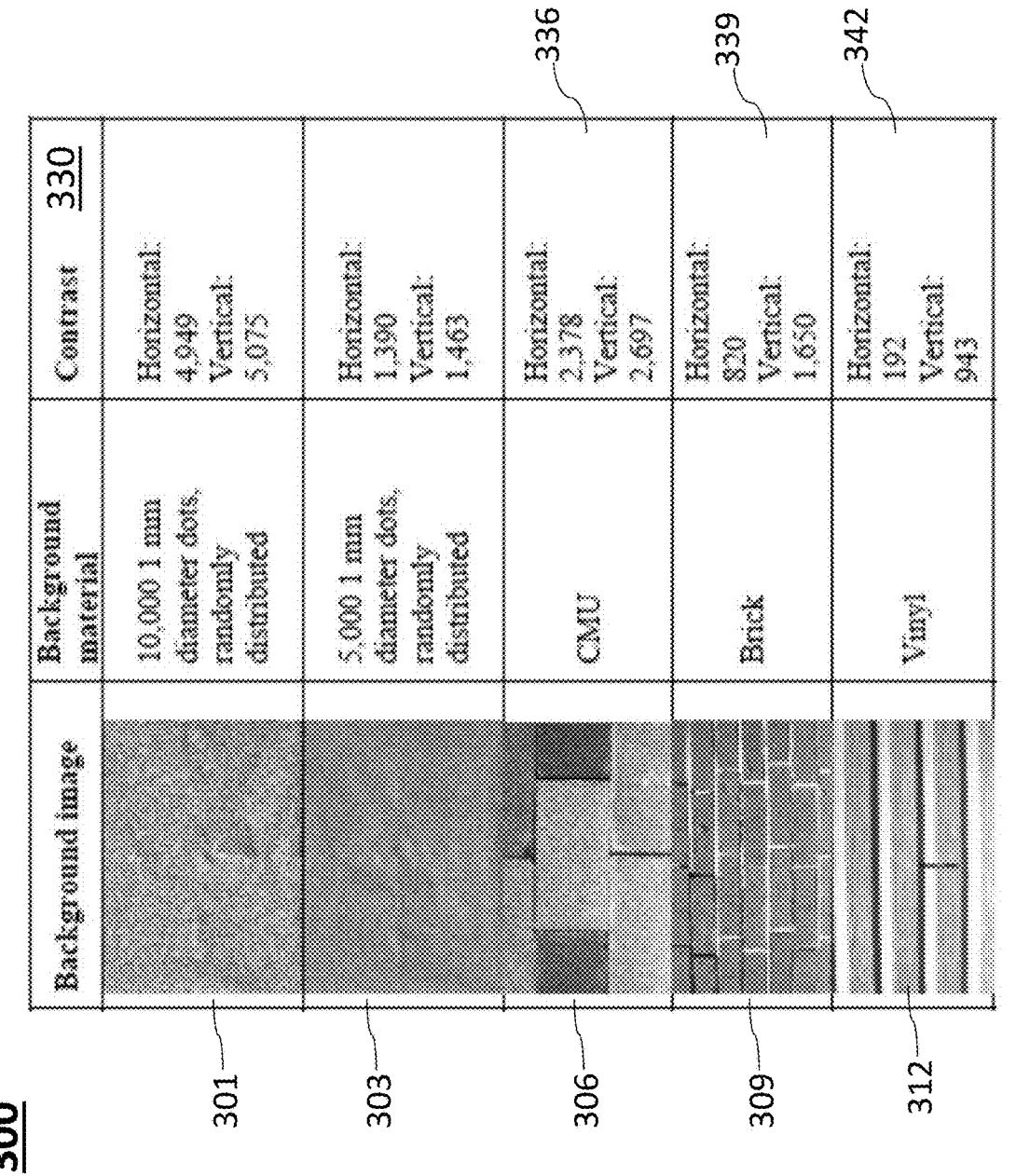
FIG. 4 provides a table showing the contrast—a texture feature that was computed—for the horizontal and vertical directions for example different background cladding mate- rials.

FIG. 4 provides a table 300 showing the contrast-a texture feature that was computed for the horizontal and vertical directions with a pixel step size of 5 for the 5 different backgrounds. As shown in FIG. 4, contrast 330 is calculated by an ImageJ plug-in GLCM Texture Analyzer using a 5-pixel step size for multiple background materials, including a first optimized background 301 for refractive-fluid flow imaging, a second optimized background 303 for refractive-fluid flow imaging, CMU 306, brick 309, and vinyl 312. In FIG. 4, the random dot background 301 had 10,000 random dots of 1 mm diameter and the random dot background 303 had 5,000 random dots of 1 mm diameter, e.g., on a sheet of A4 paper. None of the real backgrounds 306, 309, 312 had as much contrast as the densest synthetic backgrounds, e.g., background 301, and thus backgrounds such as these are used for refractive fluid flow imaging using BOS photography. For the building claddings, the contrast 336 decreased from CMU to the contrast 339 of brick to the contrast 342 of vinyl siding in the horizontal and vertical directions. These claddings were tested to determine whether exfiltration through them can be visualized. The RFN-BOS method exhibited better exfiltration visualization through the claddings with high contrast than through claddings with low contrast.

Other building claddings also have high texture for visualization exfiltration (e.g., because of color gradients, shading, or texture/varying topography), such as stone, concrete, stucco and wood siding. Meanwhile, facades such as smooth glass would not provide the needed contrast for imaging transparent refractive flow.

Impact of Background to Refractive Fluid Distance and Temperature Differential on Visualization In view of FIG. 3, the location 231 of the refractive fluid in reference to the background cladding surface 203 and camera 210 affects the ability of the RFN-BOS technique to measure fluid flow. When using this technique to measure exfiltration, the distance of the fluid exfiltration with respect to the background is small but can be increased if the air pressure inside the building is increased with respect to the exterior of the building cladding. Increasing this distance can enable better visualization.

The fluid-to-background distance and fluid temperature impact visualization. As described earlier, this technique depends on the intensity of light detected by the imaging sensor. Any intensity changes in adjacent frames are assumed to be due to a moving refractive fluid. The fluid changes the direction of the light ray as it travels from the background to the sensor so that it intercepts the sensor at a different location than it otherwise would if the fluid was not present. In an embodiment, the flow can be detected if the displacement is as small as one-tenth of the pixel size. The apparent displacement ($\Delta y$) due to a refractive fluid, in the direction of the refraction angle ($\varepsilon_y$) shown in FIG. 2, can be found by equation 4), as follows:

$$\Delta y = \frac{Z_i d_r}{d} \cdot 2\left(\frac{n}{n_0} - 1\right) \tag{4}$$

That is, referring to FIG. 2, there is illustrated the displacement ($\Delta y$) which describes the distances in equation 4), where $d_r$ is the distance between the background and the refractive fluid, $Z_i$ is the distance between the lens and imaging plane, d is the distance between the background and the lens, n is the refractive index of the refractive fluid, and $n_o$ is the refractive index of the ambient air. According to equation 4, if $d_r$ or $n/n_o$ is increased, $\Delta y$ is increased. The distance $d_r$ can be increased by increasing the pressure difference between the inside and outside of the building. The difference between the refractive index of the indoor air, n, and outdoor air, $n_0$, is changed by the naturally varying outdoor air temperature or the conditioning of the indoor air by the building's heating and air conditioning system. This technique can be used on days when there is sufficient temperature difference between the indoor and outdoor air which can be artificially produced by manipulating the indoor temperature via the building's air conditioning system.

The expected displacement for air leakage was calculated using various assumptions, including the distance the exfiltration flows out from the cladding. For this purpose, $d_r=30$ cm was used. Other assumptions of the ambient and exfiltration air were that both were at 50% relative humidity, had 450 ppm of carbon dioxide, and were at 101,325 Pa of pressure. These variables were needed to calculate the refractive index at 540 nm for the ambient and exfiltration air. The working distance, d, was 1.0 m, the lens had a 25-mm focal length, and the camera had a pixel size of 3.45 µm. Using these values, varying $n_0$, and implementing a measurement procedure, the displacement of the background due to the exfiltration was estimated, as shown in FIG. 5.

Figures 5, 6:
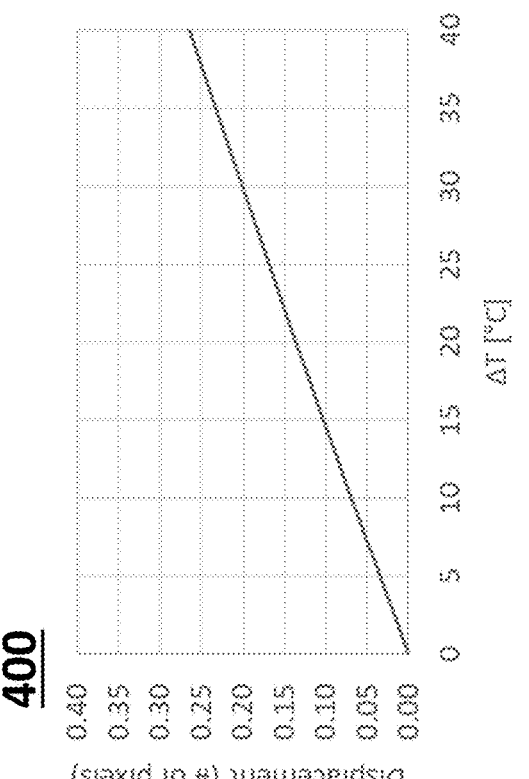
FIG. 5 depicts a plot of the displacement of a light ray incident on an imaging sensor due to exfiltration as a function of the temperature difference between the ambient and exfiltration air.
FIG. 6 provides a table depicting images of types of cladding and the design crack dimensions for each cladding type when conducting measurements in an illustrative embodiment.

FIG. 5 particularly depicts a plot 400 of the displacement of a light ray incident on an imaging sensor due to exfiltration as a function of the temperature difference between the ambient and exfiltration air. Conditions were such that the exfiltration is at a distance of 30 cm from the cladding. In FIG. 5, the displacement of the background due to the exfiltration is shown (on the Y-axis) as a function of the temperature differential between the ambient and exfiltration air (X-axis). In this case, the exfiltration was 20° C. and the ambient air temperature was varied. As ΔT (the temperature difference measured between the exfiltration and ambient air) increased, the displacement increased, which improved the ability of the RFN-BOS technique to visualize and measure exfiltration. FIG. 5 shows that if a displacement of 0.1 pixel is required for the BOS technique, then theoretically, exfiltration with a ΔT of 15° C. or greater should be able to be visualized, given a suitably textured background. However, sufficient pixel displacement occurs even if ΔT is as low as 5° C. when using difference imaging to visualize refractive features.

Referring to FIG. 3, in the apparatus for measuring building exfiltration that includes a cladding 202 with an opening crack 215, the data acquisition system 230 included a temperature sensors to measure the temperature of the exfiltration air at the exit of the crack 231, ambient air 221 behind the cladding, and cladding surface 203. The range and accuracy of the temperature sensors range from −229° C.-200° C. with an accuracy of ±1.4° C. A Testo 417 vane anemometer was used to measure the velocity of the air at the crack exit. The range and accuracy for the Testo 417 vane anemometer is 0.3-20 m/s and ±0.1 m/s+1.5% of reading, respectively.

Further as shown in FIG. 3, to image the exfiltration, a Grasshopper3 Teledyne FUR mono machine vision camera 210 was pointed directly at the exfiltration the distance d=0.6 m away, with the optical axis oriented normal to the cladding surface. This 2.3-megapixel camera is capable of 163 frames per second with a Sony IMX174 sensor. A 12 mm fixed focal length lens was used for all measurements. The camera was used to take 5 second videos of the exfiltration with a frame rate of 30 frames per second. For the velocity measurement, it is critical that the camera frame rate is fast enough to measure the velocity. The integration time ranged from 0.9 to 16 ms and depended on the ambient lighting conditions and f-stop used for each experiment. A computer device 250 such as a laptop running SpinView 2.3.0.77 software was used to acquire monochromatic raw video from the camera at 8-bit resolution. A custom National Instrument LabVIEW virtual instrument on the laptop was used to acquire temperature at the three locations 211, 221, 231 during video acquisition. The average temperatures during acquisition were used to compute the temperature difference between the exfiltration and ambient air reported for each measurement.

As shown in FIG. 6, there is provided a table 500 depicting the three types of building claddings consisting of CMU, brick, and vinyl siding each having a air exfiltration opening or crack that were used to prove they had sufficient texture for the RFN-BOS technique to successfully image exfiltration. In the table 500 depicted in FIG. 6, each cladding type had a crack 215 with a width dimension of about 6 mm for CMU and brick claddings and 8 mm for vinyl siding. Further, the crack for the CMU cladding had a height dimension of 203 mm, the brick cladding crack had a height dimension of 57 mm, and the vinyl siding crack had a height dimension of 105 mm.

Referring to FIG. 3, the BOS optical system was used to conduct exfiltration measurements for each of the cladding types shown in FIG. 6. Measurements were conducted in a cool-weather environment, so the temperature difference between the exfiltration and ambient air would emulate heating season conditions, and in calm winds. Measurements were completed for the three test cladding types of FIG. 6 with varying sky conditions and exfiltration air temperatures. To emulate different exfiltration temperatures, the heating element on the ceramic heater was turned off and the temperature of the exfiltration was monitored, when the exfiltration was at the desired temperature, the camera device was operated to begin a 5-second-long video acquisition. A no-flow condition was also captured by the camera to compare with the heated flow visualizations.

Transparent Fluid Flow Visualization Algorithm

Figures 7, 8:
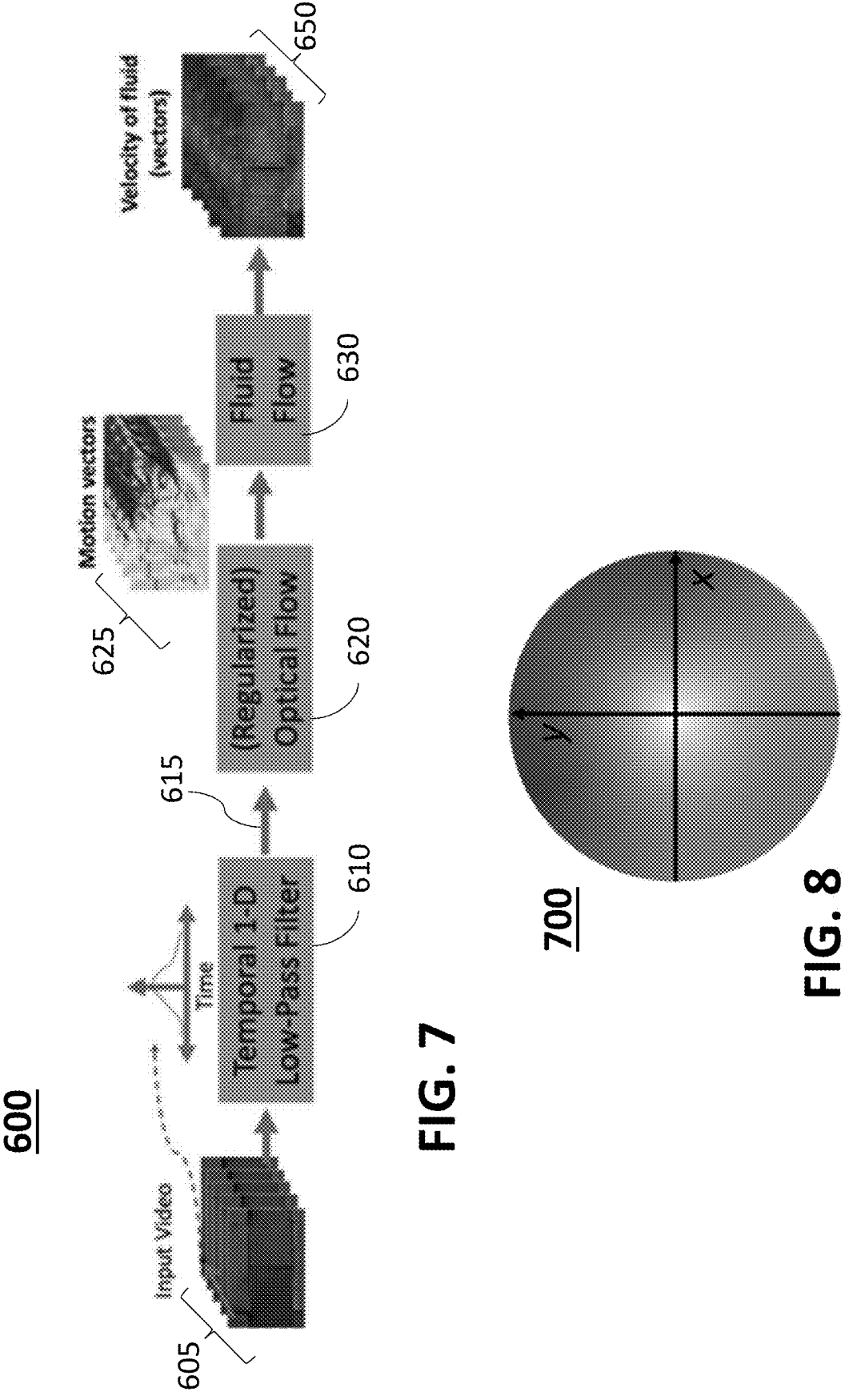
FIG. 7 depicts a schematic of a two-stage fluid flow visualization algorithm used for producing a velocity vector map at each spatial location for every camera image frame according to one embodiment.
FIG. 8 particularly illustrates one embodiment for map- ping between colors of a color wheel and velocity vectors with each velocity vector being normalized so that those above a threshold value are mapped to unit vectors of a color wheel.

FIG. 7 depicts one embodiment of a method 600 for visualizing the motion of a transparent fluid in front of a fixed background. The central idea behind the method is that when a transparent fluid flows in front of a sufficiently textured background, it distorts the background pixels in a small yet systematic manner that is related to the flow of the fluid. By determining this small distortion from the video data, the flow of the transparent fluid can be detected and visualized.

Specifically, in the fluid-flow-visualization method 600 of FIG. 7, two stages of a regularized optical flow algorithm are used. The regularization strategy is used with optical flow to enforce smoothness in the results to address noise in the low-exposure videos, which can result in noise/irregularities in the resulting optical flow vectors. As shown in FIG. 7, each input video frame 605 is first preprocessed using a 1D Gaussian function filter 610 to suppress high frequency noise in the temporal dimension. The resulting video 615 is processed by an optical flow algorithm 620 to produce motion vectors 625 at each location in every frame (the colors represent a 2D vector). This output 625 is a vector field indicating local (subpixel) motion in the video frames and is visualized in what is referred to as a wiggle plot. The vector field from this first stage is then fed to a second specifically designed optical flow algorithm (termed fluid flow) where the input is a video of vector fields. That is, the motion vectors 625 are processed by a second optical flow-like method, i.e., a fluid flow algorithm 630 for producing a velocity vector map 650 at each spatial location for every frame. That is, the output of this second stage is another vector field, which corresponds to the velocity of the fluid flow.

Finally, to visualize the velocity vectors produced by the algorithm (in pixels per frame unit), the method run included two different modes: One mode is to map the 2D velocity vectors to a color wheel, such as shown in FIG. 8, where the color wheel 700 is saturated at the edges and transparent at the center. FIG. 8 particularly illustrates the mapping between colors and velocity vectors with each velocity vector being normalized so that those above a threshold value are mapped to unit vectors. These unit vectors map to the saturated colors (outer ring) of the color wheel. In this embodiment, a user inputs a magnitude threshold that determines which velocity is significant, and all vectors larger than this value are mapped to high-saturated colors that reside in the outer periphery of the wheel 700, as shown in FIG. 8. All other vectors are mapped to the interior of the color wheel 700. This color image is then overlaid with the acquired video to indicate the measured velocity in each location of each frame. In a second mode of visualization, the vectors are mapped to actual pictures of an arrow if they are larger than the user determined threshold value. Such a plot is called a quiver plot, and it provides a useful way to visualize the flow when overlaid on the acquired data. In operation, for the algorithm, the user needs to determine an appropriate value for the threshold that results in a video with no major saturation/vectors when the video is of a known structure with no fluid flow.

Figure 9:
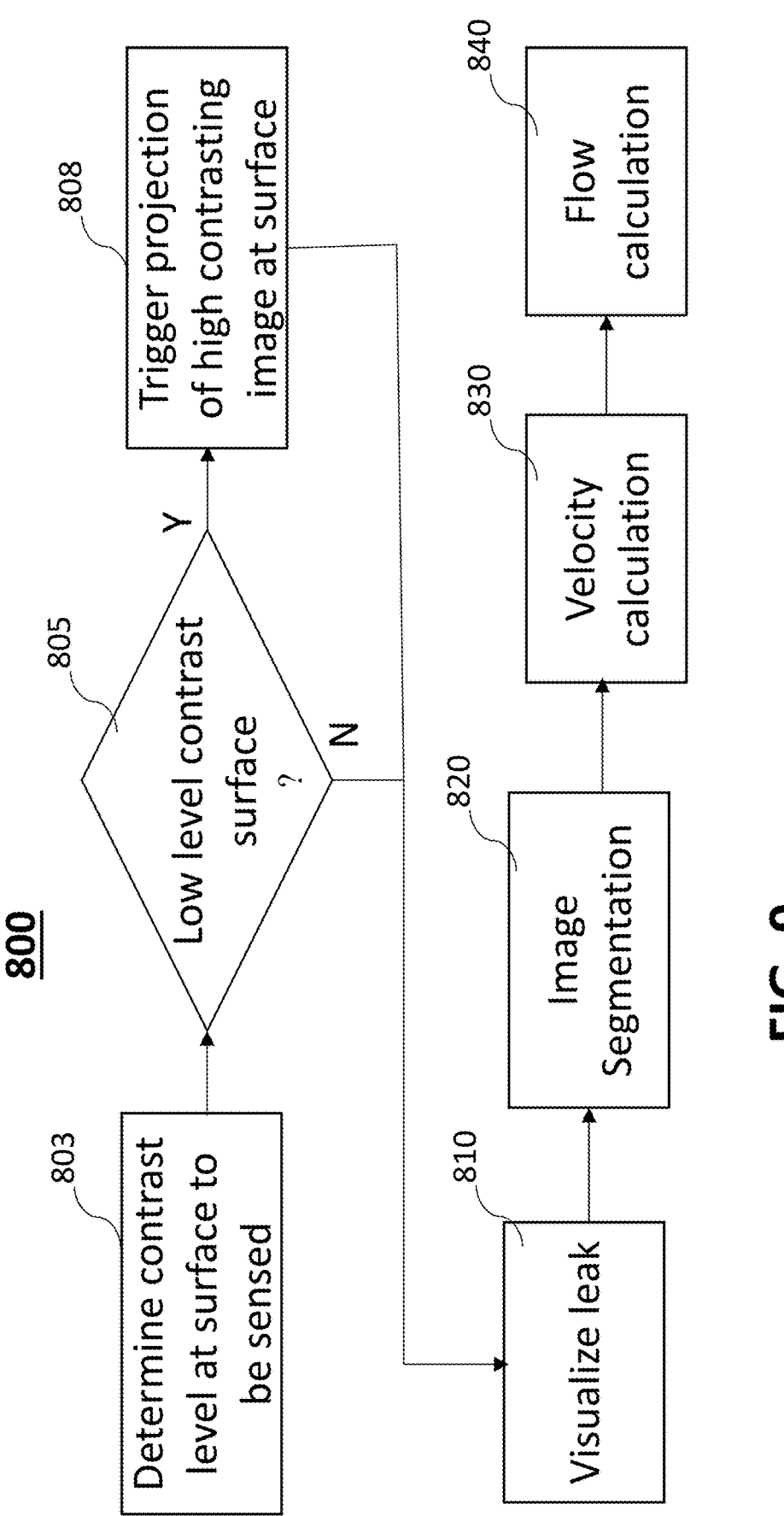
FIG. 9 depicts an alternate method for visualizing the motion of a transparent fluid in front of a fixed background using the BOS optical system of FIG. 3.

In a further embodiment, as shown in FIG. 9, there is depicted an alternate method 800 for visualizing the motion of a transparent fluid in front of a fixed background using the BOS optical system of FIG. 3. The alternate method 800 shown in FIG. 9 optionally includes a first step 803 of determining a contrast or textural level of the surface to be sensed. In an embodiment, a contrast level can be determined using Table 300, column 330 shown in FIG. 4 that shows contrast levels of various background surface materials, or alternatively, by computing a contrast level using an ImageJ GLCM Texture Analyzer plug-in or equivalent analysis software. In an embodiment, the background can be imaged with a single camera to determine its suitability for the BOS photographic technique, then it can be determined to increase the background texture by projecting a patterned image. Then, at 805, FIG. 9, a determination is made as to whether the background surface material (cladding) is a low contrast material (e.g., home drywall, white vinyl) which would not provide enough texture or pattern for BOS to detect apparent motion and where applying a pattern would be suitable for visualizing motion of a transparent fluid leaking from the surface. In an embodiment, a quality metric as obtained by implementing texture analysis can be used to determine if a surface is suitably textured or of a high contrast for purposes of BOS optical leak detection. If the determined contrast is of a high enough value such that the surface texture is suitable for leak detection according to the methods herein, then the process continues to 810 where a four-stage method is implemented to visualize and detect air leakage. Otherwise, at 805, if the determined contrast is of such a low level that is not suitable for the visualizing apparent motion for detecting a leak, then the process proceeds to 808 where a projection device, such as the light image pattern projection device 240 of FIG. 3, is controlled to first generate and project an image pattern upon the building material surface to increase the texture of the building surface at the area being scanned for leaks and allow and/or enhance BOS. Then, the process returns to a first step 810 of the four-stage method to visualize and detect air leakage.

Pattern Projection Sub-System for Enhancing Background Oriented Schlieren

In an embodiment, if the background surface of the cladding (building material) does not have suitable contrast, e.g., home drywall, vinyl siding, then a coherent or incoherent light image pattern projection system is implemented to generate an image that can be projected upon the surface being sensed to create a sufficient high-contrast apparent background or texture suitable for BOS photography.

In the embodiment of FIG. 3, a coherent or incoherent light image pattern projection system 240 can be used to project a random dot or other pattern onto the cladding surface to allow and/or enhance BOS without permanently altering the background surface. Other projected patterns for enhancing BOS leakage detection can include laser-speckle patterns and other patterns. For example, a laser light image pattern projection system 240 using a laser with diffractive optical elements (DOEs) or other optical elements can be implemented to create a point cloud across the surface. A common incoherent light projector could be used to project visible light sources. And other visible and invisible, coherent and incoherent light sources are possible to create a projected pattern. An invisible light pattern with suitable spectral filtering and camera sensitivity could be applied for "stealth" BOS in light and dark or day and night applications. For example, a wavelength of light that is not visible (e.g., infrared) and a suitable video camera sensor detector detecting at that invisible light wavelength can be used in a "stealth" BOS application for leakage detection.

Figure 12B:
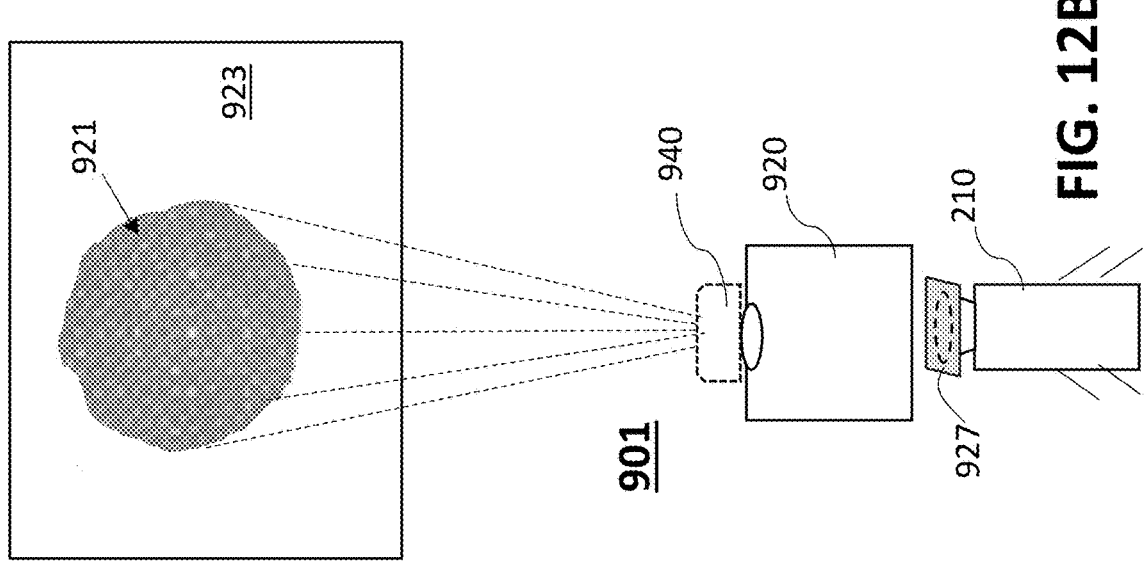
FIG. 12B depicts an alternative image projection system for projecting a pattern using a coherent laser light source wherein the projected image pattern is a laser-based pattern shown projected on a BOS insensitive (i.e., low-contrast) surface in an embodiment.
Figure 12A:
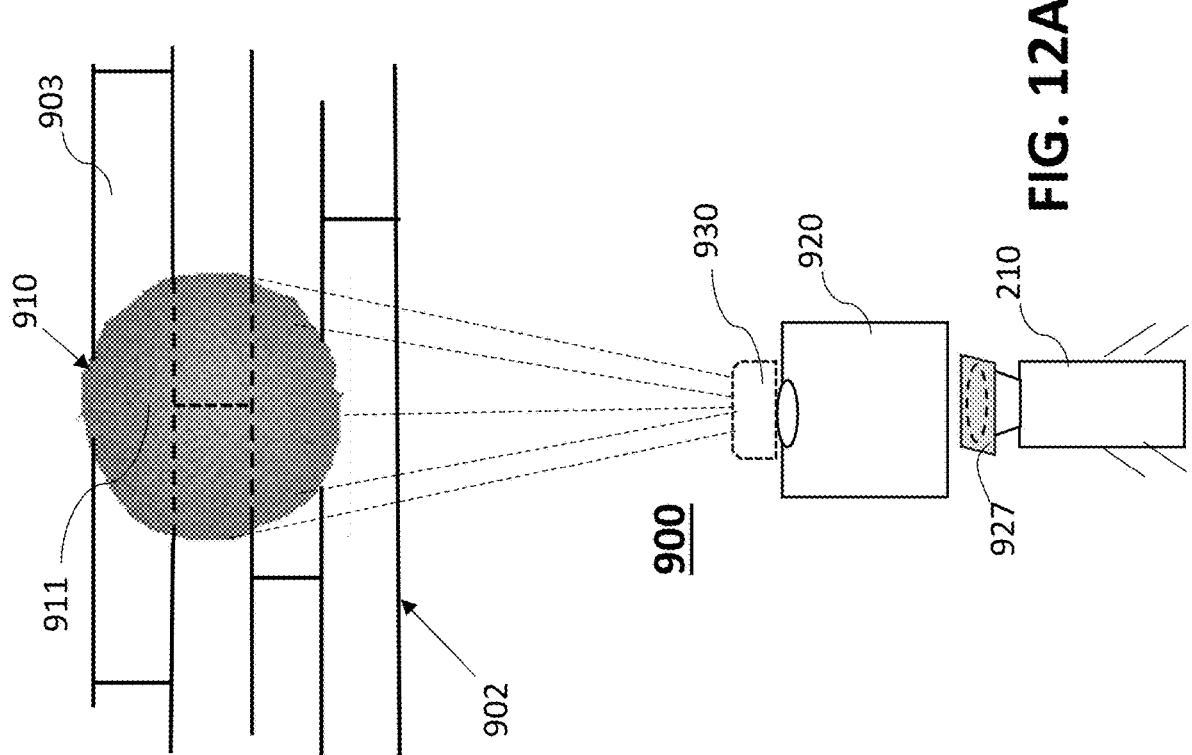
FIG. 12A shows an image projection sub-system config- ured for projecting a high contrast light image upon a BOS insensitive (i.e., low-contrast-surface) material, in an embodiment.

FIG. 12A shows an image projection sub-system 900 configured for projecting a high contrast light image 910 upon a surface 903 of the low-contrast cladding material (e.g., white vinyl siding) 902 prior to the video camera 210 capturing images of the low contrast material surface. In an embodiment, the image projection sub-system for projecting the high contrast image includes a coherent laser light source 920 with patterning optics, e.g., a diffuser 930, wherein coherent laser light is diffused to provide a laser speckle pattern 911 as a background surface texture upon the low contrast cladding material surface 903. In an embodiment, the laser speckle pattern appears more dense near the center of the image and less dense near the edges of the projected pattern. The laser light source 920 can be a solid-state, gas or other laser light source, e.g., HeNe laser, etc., producing coherent light at wavelengths within camera sensitivity range, e.g., at a wavelength such as 520 nm (e.g., green) and at suitable power levels, e.g., a Class 3 or lower (e.g., 1-5 milliwatts) laser source. In an embodiment, the patterning optics can include any optical element to project a light image pattern including, but not limited to: a diffuser, a diffraction optical element, a diffractive beam splitter, or a high resolution reticle. In FIG. 12A, in a non-limiting embodiment, the coherent laser light source 920 with patterning optics 930 is shown co-located with, at or near (e.g., above/below or to the side of) the video camera or like camera sensor 210 that is configured to focus upon the building cladding surface and capture images at the location on the surface 903 where the image is projected by the coherent laser light source 920 prior to capturing a sequence of image frames targeting the surface at that projected image location.

Although not required, in an embodiment shown in FIG. 12A, the video camera or camera sensor can be configured for increased sensitivity by providing an optional bandpass filter 927 at the front of the camera, e.g., at the imaging camera lens, to only permit the scattered laser light to interact with the camera sensor and not the ambient light or uninterested wavelengths.

FIG. 12B depicts an alternative light image projection system 901 for projecting a pattern using a coherent laser light source 920 wherein the projected image pattern is a laser-dot pattern 921, e.g., shown projected on a BOS insensitive, i.e., low contrast (e.g., a white vinyl) surface 923. In this embodiment, the image projection sub-system for projecting the high contrast image includes a coherent laser light source 920 with patterning optics, e.g., a diffractive element 940, wherein coherent laser light is diffracted to provide the laser-dot pattern 921 as a background surface texture upon the low contrast cladding material surface 923. In an embodiment, the laser dot can be 1 mm in diameter and the pattern of 1 mm dots can be configured at 16 dots/cm$^2$ density. Alternately, the laser dot can be 2 mm in diameter and the pattern of 2 mm dots can be configured at 8 dots/cm$^2$ density. In FIG. 12B, in a non-limiting embodiment, the coherent laser light source 920 with diffractive element 940 is shown co-located with, at or near (e.g., above/below or to the side of) the video camera or like camera sensor 210 that is configured to focus upon the building cladding surface and capture images at the location on the surface 903 where the image is projected by the coherent laser light source 920 prior to capturing a sequence of image frames targeting the surface at that projected image location. Although not required, the video camera or camera sensor can be configured with an optional bandpass filter (not shown) to reject ambient light and only permit the laser light to interact with the camera sensor.

Figures 13A, 13B:
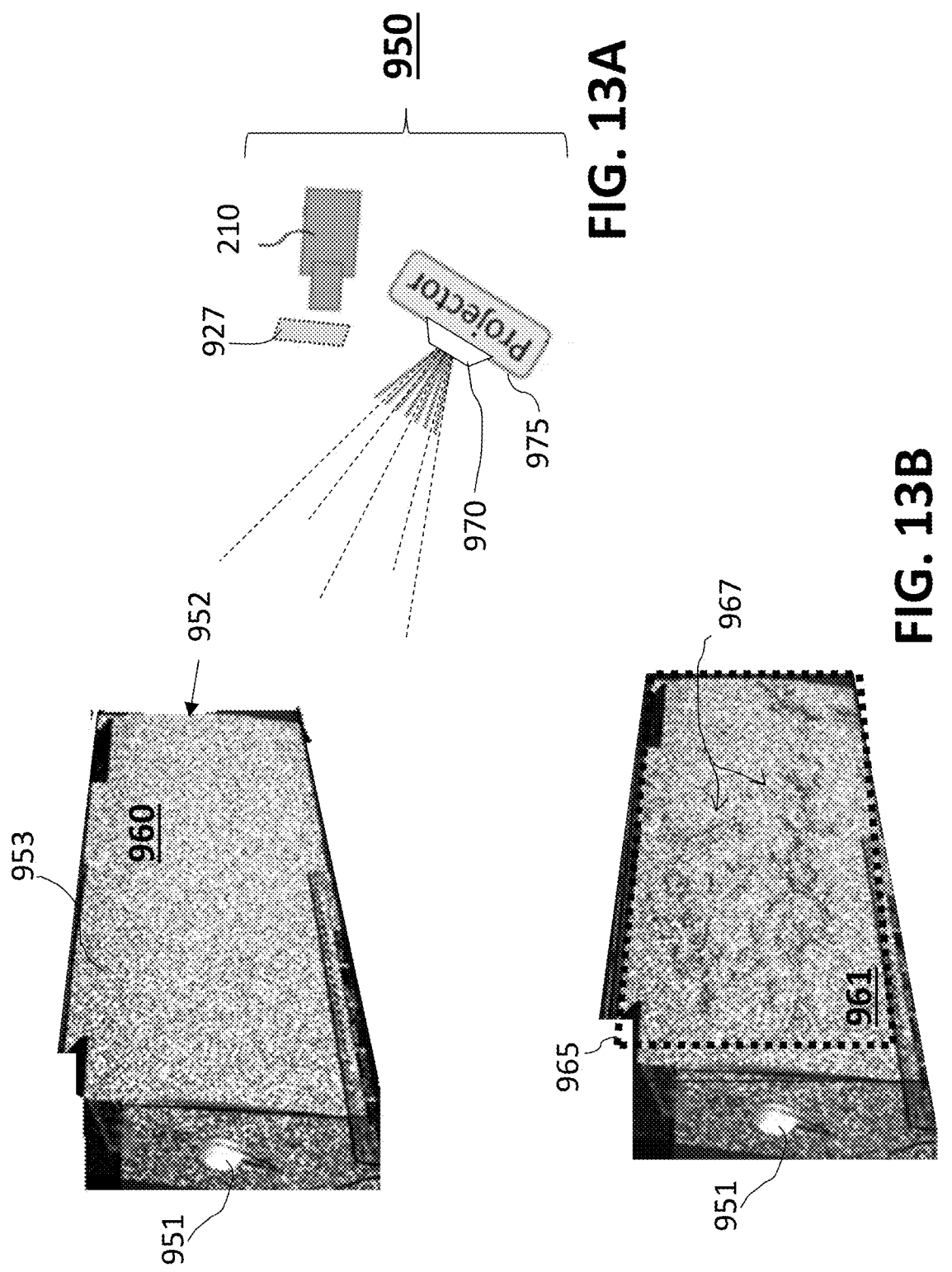
FIG. 13A depicts a further alternative light image projec- tion system used for projecting a high-contrast light-image pattern upon a low-contrast surface of a building cladding material in an embodiment.
FIG. 13B depicts a resulting leak visualization after processing a sequence of two images captured by camera device 210 using the light image projection system as in FIG. 13A.

FIG. 13A depicts an alternative light image projection sub-system 950 used for projecting a high contrast light image pattern 960 upon a low-contrast surface 953 of a building cladding material 952 prior to the video camera 210 capturing images of the low contrast material surface. There is depicted in FIG. 13A, a 1.0 inch diameter hole 951 through which can provide an air flow or leak. In the embodiment of FIG. 13A, an incoherent light source such as a high-resolution projector 975 is used for projecting a light image pattern on the low-contrast (i.e., BOS insensitive) cladding material surface. The image projection sub-system 950 for projecting a high contrast image pattern or texture can include a high resolution (e.g., high-definition) image projector, 975, which can be programmed to project a high contrast image pattern 960 upon the low contrast cladding material surface 953. In a non-limiting illustrative embodiment, the high-definition (HD) image projector 975 can be Full HD, e.g., providing 1080 DPI, or 1920×1200 pixel resolution, or could be a 4K projector, e.g., providing 3840×2160 pixel resolution. Further, the projection system can include an incandescent, gas, LED or other incoherent light source and a mask or filter 970 with holes at the light projector for generating the high-contrast or textured image such as the high contrast random dot pattern image 960 or other incoherent light dot, line or other patterns for providing an apparent background surface texture suitable for use with BOS leak detection. In an embodiment, using a 1920× 1200 resolution projector, the projected image 960 includes random dots, e.g., 2 mm diameter dots, at a density of 8 dots/cm². In FIG. 13A, in a non-limiting embodiment, the high-resolution projector 975 is shown co-located with, at or near (e.g., below or to the side of) the video camera or like camera sensor 210 that is configured to focus upon the building cladding surface 953 and capture raw images targeted at the location on the surface 953 where the image is projected by the high-resolution projector 975.

FIG. 13B depicts a resulting visualization 961 after processing a sequence of two images captured by camera device 210 using the light image projection system 950 of FIG. 13A. In FIG. 13B, there is shown a region of interest 965 with a visualized air flow turbulence 967 from air leaking from the 1.0 inch diameter hole. In FIG. 13B, the image 961 is shown depicting the existence of a leak (e.g., air flow dynamics or air plume) 967 very close to the background surface and which, due to the difference in air density between the generated air plume and ambient air, could be visualized. That is, the projection system of FIG. 13B can be used to indicate that the background projected pattern is sufficient for the BOS optical system to capture leaks for visualization in a sequence of images taken by the video camera or camera sensor 210.

In the embodiments shown in FIG. 13A, 13B, the video camera or camera sensor can be configured for increased sensitivity by providing an optional bandpass filter 927 at the front of the camera, e.g., at the imaging camera lens, to only permit the camera sensor to receive light at projected-pattern wavelengths.

Further, in an alternate embodiment, the image projection sub-system for projecting a high contrast image upon a low-contrast cladding surface can include an incoherent light source such as a high powered LED flashlight. In such an embodiment, the flashlight can be coupled with a device to help collimate the light to narrow the flashlight beam angle, and further coupled with a mask or filter or diffraction optic configured for producing a random dot, dot, linear, shaped or other pattern upon the low contrast cladding material surface 903. Referring to FIG. 3, in a non-limiting embodiment, the flashlight may be co-located with, at or near the video camera 210 and is configured to focus upon the cladding surface at the location where the image projected by the flashlight and mask is located prior to obtain a sequence of image frames of the surface at that location.

Referring to FIG. 9, the alternative method 800 is a four stage method to visualize and detect air leakage including: 1) a visualize leak stage 810, 2) an image segmentation stage 820, 3) a velocity calculation stage 830, and 4) a flow calculation stage 840. In an embodiment, a computer, such as a computer device 250 of FIG. 3, includes a processor that can process the stream of frames from the camera using the method of FIG. 9. Alternatively, an integrated circuit chip provided in the camera or video camera 210 itself can include a processor device programmed with RFN-BOS optical system processes used for detecting building leaks from a stream of image frames at the camera or video camera device itself.

FIG. 10 shows additional details depicting aspects of the alternative method 800 of FIG. 9. As shown in FIG. 10, whether the RFN-BOS optical system processes of FIG. 9 are implemented in a separate computing system or at the video camera device itself, for the leak visualization stage, a sequence of raw image frames 802 from the camera are input into the processor. These raw frames can be a video camera sequence of image frames used for visualizing the motion of a transparent fluid in front of a fixed (high-contrast) cladding material background either with or without a background image projection. Any processing software package, such as MATLAB, Python, or LabView can be leveraged to implement the image processing steps detailed in FIG. 10. In one embodiment, the processing was performed using MATLAB PIVMat Toolbox.

Figure 14C:
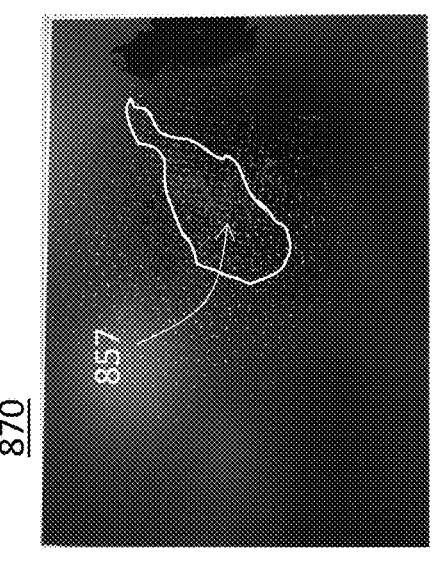
FIGS. 14A-14C depicts an embodiment using projected image pattern upon a building material based on a coherent laser including a processed difference image of an example visualization showing absence of an air plume (FIG. 14B) and a processed difference image of an example visualization showing presence of an air plume (FIG. 14C) in an example embodiment.
Figure 14B:
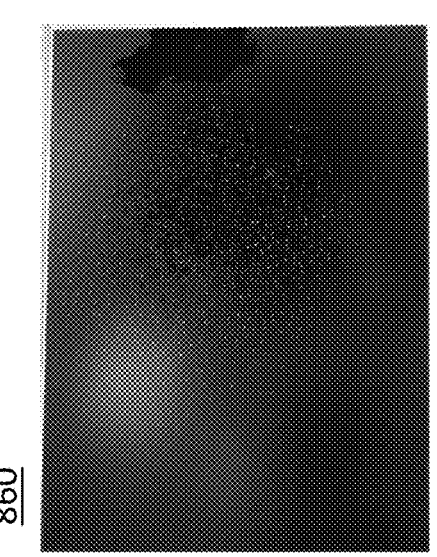
Figure 14A:
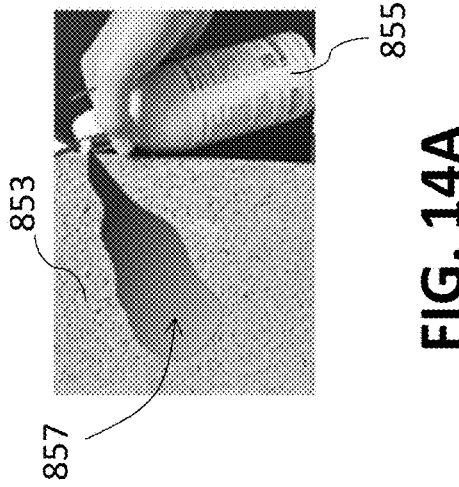

In FIG. 10, the input raw camera image frames 802 are processed in real-time using a difference imaging algorithm to visualize the air exfiltration (leak). In an embodiment, the difference imaging algorithm operates to compute differences of light intensity between successive (adjacent) images sensed by the camera at each pixel location. Such a difference imaging algorithm performs a calculation according to equation 5) as follows:

$$\Delta I_{x,y} = I_{x,y}^{F_i} - I_{x,y}^{F_{i-1}} \tag{5}$$

where I is the intensity of light sensed at the pixel location, x is the pixel column location, y is the pixel row location, i is the image frame number. As a result of iterating through each successive image frame of a video sequence, based on the obtained differences in intensities at pixel locations in successive image frames in accordance with equation 5), the presence of any air flow movement, i.e., air turbulence, air fluctuations, or air leakage is visualized in one or more frames of the sequence of image frames 812. As referred to herein, air flow "movement" is defined as any dynamic air flow including a change of direction or velocity of an air plume over time, any entrainment of ambient air with an air plume causing turbulence (air turbulence), and/or any air plume in a region of interest that had previously not existed. Even when the background texture is provided by a laser/patterning optics high-resolution projection sub-system of FIG. 12A, the difference of two images will reveal an air flow turbulence or fluctuation. For example, as shown in FIG. 14A, there is depicted an example can of air 855 with a 'canned air' spray nozzle that emits a plume of air 857 shown directed near a surface 853 of a building cladding, e.g., a concrete masonry unit surface. FIG. 14B shows a processed difference image 860 of a cladding surface 853 upon which there is a laser dot pattern projected using the laser image pattern projection system according to embodiment of FIG. 12A. In FIG. 14B, no air flow from canned air is shown. However, FIG. 14C also shows a processed difference image 870 of the cladding surface 853 upon which there is a laser dot pattern projected using the laser image pattern projection system according to embodiment of FIG. 12A. However, in FIG. 14C there is depicted the visualized air flow 877 from the canned air on the background surface. Thus, an air can plume can be visualized with projected laser dot pattern even when the plume is very close to the background (without the laser dot pattern, the air plume cannot be seen).

Referring to FIG. 10, continuing at 822, the method implements an image segmentation technique to define a region of interest (ROI) of any potential detected leak. In an embodiment, a state of the art image segmentation technique can be implemented including, but not limited to: a region-based segmentation method, or an edge or boundary-based segmentation method. The ROI is depicted as a segmentation box 824 which, in a non-limiting implementation, can be a few inches in length and in height and its location can be determined manually or in an automated fashion. A potential leak or detected air turbulence or fluctuation present within the ROI 824 is shown highlighted as 825.

Continuing to 832, using cross-correlation processing functions such as included in MATLAB, there is performed a further step of computing the velocity of the air turbulence or air leak using a cross-correlation of the turbulent features in sequential difference images. In an embodiment, an air leak velocity $v_{x,y}$ is calculated in accordance with equation 6) as follows:

$$v_{x,y} = d_{x,y} \times f \times sc \qquad (6)$$

where $d_x$ and $d_y$ are the measured pixel-shifts/frame for the ROI 824, f is a camera frame rate (frequency) in Hz, sc is the spatial calibration of the camera in m/pixel, and $d_{x,y}$ is the measured pixel-shift resulting from the air movement in the X direction ($d_x$) in pixels/frame and that in the Y direction ($d_y$) in pixels/frame for the ROI in an image frame identified in FIG. 10 as the image frame number along the x-axis.

Figure 11:
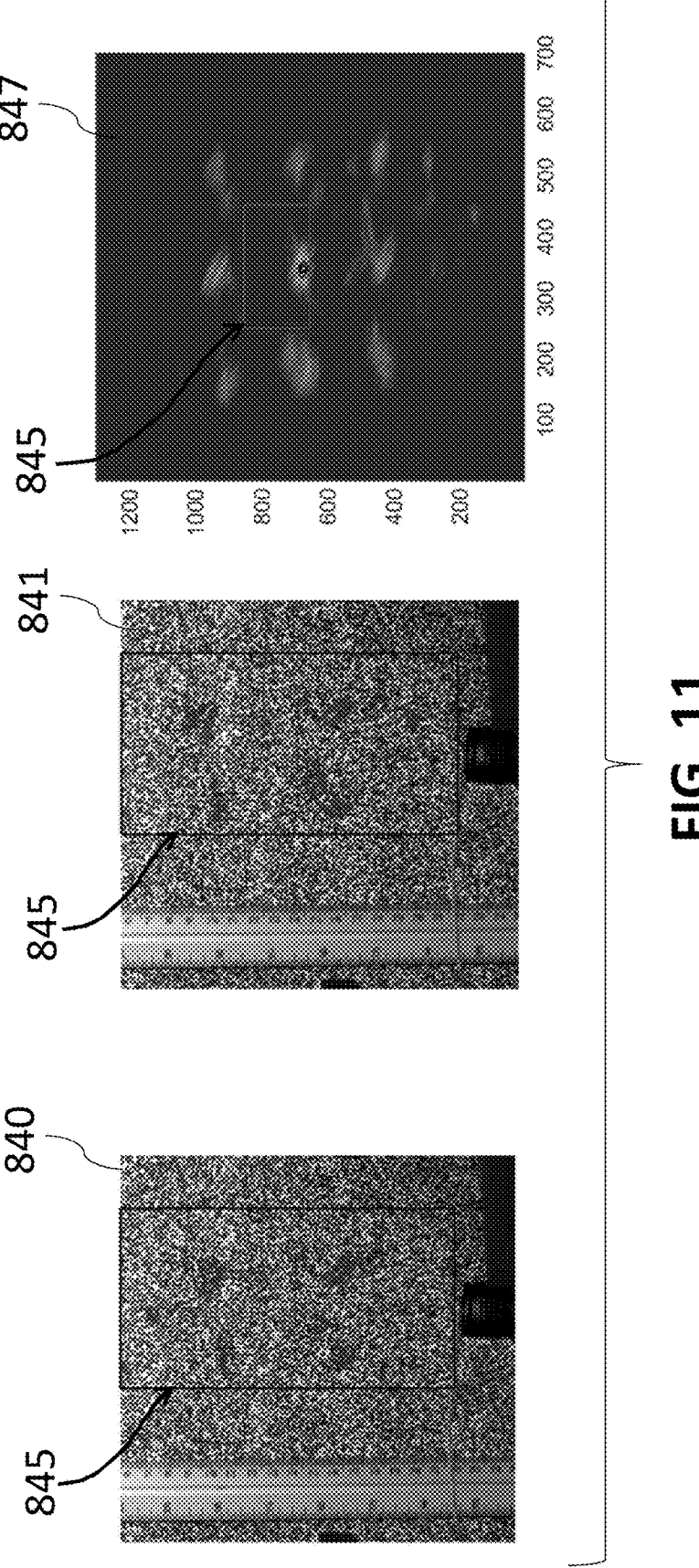
FIG. 11 depicts, for an illustrative air leak velocity measurement, an example cross-correlation based calcula- tion that requires coherence of refraction effects between consecutive video frames.

As shown in FIG. 11, in the air leak velocity measurement, the cross-correlation based calculation requires coherence of refraction effects between consecutive frames; i.e., the pixel-shift wiggles in the difference images should be of similar but displaced or distorted shape. FIG. 11 shows consecutive frames 840, 841 each showing a ROI 845 within which were pixels were detected indicating a fluid fluctuation such as an air plume. A resulting plot 847 of the computed cross-correlation where the x-axis is the pixel number along the horizontal direction and the y-axis is the pixel number along the vertical direction of the camera sensor is shown reflecting the coherence of refraction effects within the ROI 845 between the consecutive frames 840, 841. Any known dimension in the field of view can be used to convert pixel/frame displacement to distance/time displacement, e.g., given 279 μm/pixel; then $V_y$ [m/s]=$d_y$ [pixels/frame]·0.000279 [m/pixel]·f [frames/s or Hz].

Then, continuing to 833 in FIG. 10, there is performed the additional step of computing a volumetric flow rate (Q) of the detected air movement, e.g., fluctuation, turbulence or leakage in the ROI 824 according to equation 7) as follows:

$$Q = v \times \pi \times \left(\frac{d}{2}\right)^2 \qquad (7)$$

This step involves first identifying, within the ROI, a plume region corresponding to the dynamic air movement feature. Using the cross-correlation of difference images, the plume velocity is measured, e.g., when flow is parallel with the background. In an embodiment, the plume region corresponds to a diameter of the leak. Then the method estimates a cross-sectional area bound of the plume region 835 by accumulating multiple successive difference images to quantify the envelop of leaking flow. According to equation 7), the volumetric flow rate (Q) is then computed by multiplying the velocity found at 832 with the estimated cross-sectional area based on the diameter of the leak 825. In an embodiment, the volumetric flow rate parameter Q can be used to determine the criticality of the leak (e.g., the higher the Q value the more critical or severe the leak is to fix), and this can be used as a criterion for prioritizing corrective action, e.g., sealing the most critical leak(s). In embodiments, other criterion for prioritizing corrective action include, but is not limited to: air velocity, leak diameter, or a combination of both (e.g., a velocity-diameter product or velocity-area product) that can be used as air leak ranking parameters. This approach for leakage location and measurement can enable more energy savings and reduce carbon emissions through air leakage sealing.

Figure 15:
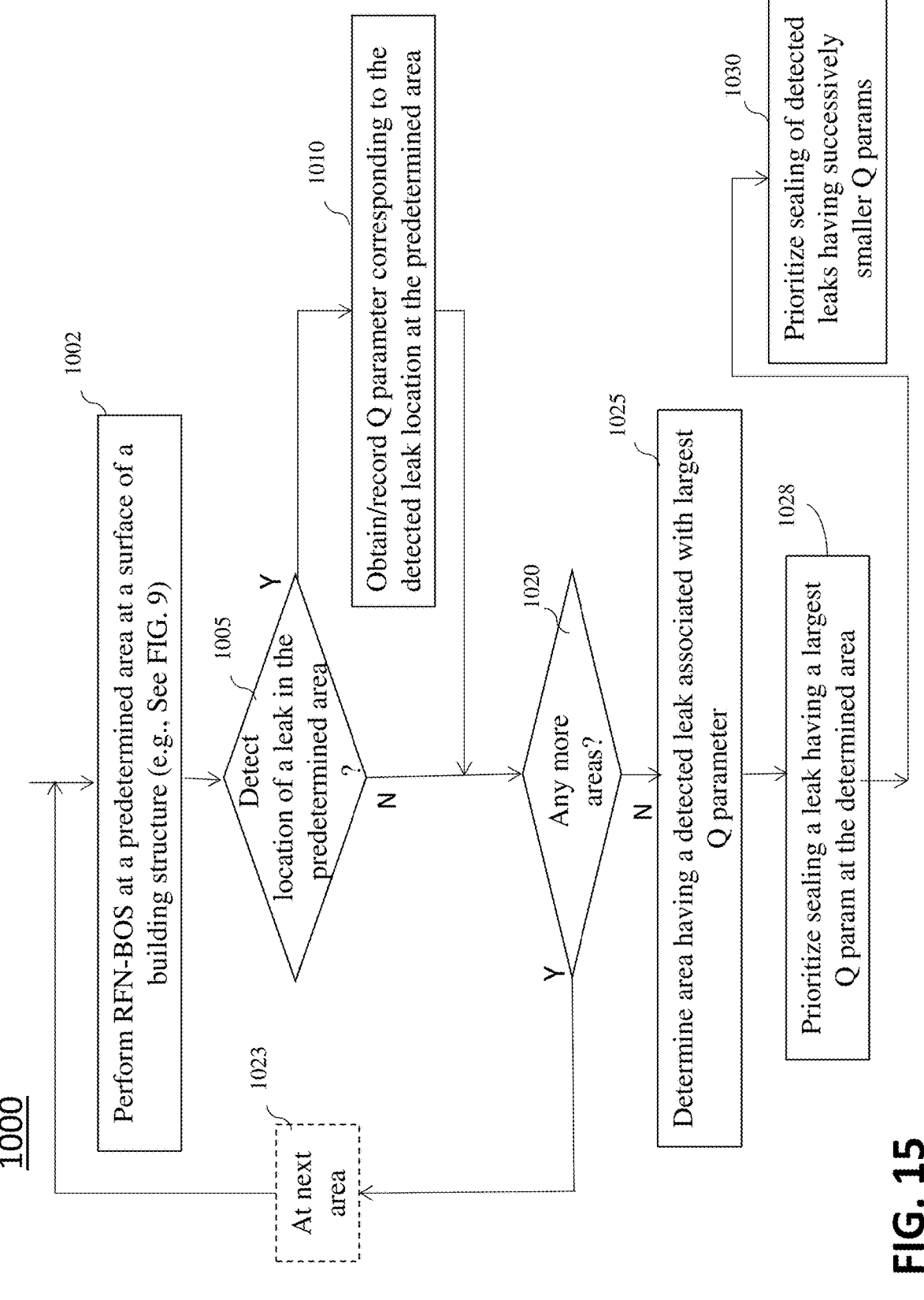
FIG. 15 shows a method that can be used to prioritize leak detection of a building using the RFN-BOS techniques in the embodiments herein.

FIG. 15 shows a method 1000 that can be used to prioritize leak detection of a building using the RFN-BOS techniques in the embodiments herein. As shown in FIG. 15, a first step 1002 is the performing of an RFN-BOS optical photography technique at a predetermined area at a surface of a building structure to detect a leak. This entails using the methods depicted in FIG. 7 or in FIG. 9 using the BOS optical system of FIG. 3. Based on the leaks using image segmentation to define ROIs, it can be decided how to prioritize leak sealing via image segmentation or 3D schlieren imaging using a single camera or stereo cameras. A determination is made at 1005 as to whether the BOS optical system has detected a leak at a location within the predetermined area. If a leak has been detected at 1005, then the process proceeds to step 1010 to compute and record (e.g., in an associated memory) the volumetric flow rate parameter, Q, corresponding to the detected leak within the predetermined area and the process proceeds directly to 1020. In an embodiment, synchronized videos from stereo cameras 210, 213 in FIG. 3 can be analyzed to determine the flow rate of individual leakage sites for the prioritized sealing. Otherwise, if there is no air leak determined in the predetermined area, the process proceeds to 1020 where a determination is made as to whether there are any more areas to detect leaks using the BOS optical system. If there are additional areas to sense using a BOS technique, the process proceeds to the next area at 1023 and the process step 1002 is repeated to perform the RFN-BOS optical photography technique at the next predetermined area at a surface of a building structure. The process steps of FIG. 15 are repeated until it is detected at 1020 that there are no more areas left to detect potential leaks at the building structure. At such determination of no more areas to test at 1020, the process proceeds to 1025 to determine the area having a detected leak associated with largest corresponding Q parameter indicating the largest air flow or leak. Then, the process proceeds to 1028, FIG. 15 to prioritize the sealing of the leak having the largest Q parameter at the determined area. Similarly, proceeding to a subsequent step 1030, the sealing of detected leaks can be prioritized for leaks of successively smaller Q parameter values.

Use-Case Results

With reference to the BOS optical system of FIG. 3, and the fluid flow visualization algorithm shown in FIG. 6, example exfiltration visualization experiments were completed for three different cladding types (CMU, brick, and vinyl siding) under two different lighting conditions (sunny and cloudy) and three exfiltration conditions. The exfiltration conditions described were (1) an experiment with no exfiltration and the heater turned off, (2) a low-$\Delta T$ experiment in which $\Delta T$ between the exfiltration and ambient air was less than 20° C., and (3) a high-$\Delta T$ experiment in which $\Delta T$ was greater than 30° C.

FIG. 16 depicts a Table 1100 listing the parameters for each test for each of the three cladding types. For each test, the integration time was set so that a few pixels were at saturation. In particular, Table 1100 shows for each cladding type, the and lighting conditions (S: sunny; C: cloudy), the temperature difference between ambient and exfiltration (none, low [<20° C.], and high [>20° C.]), and a corresponding air flow in m/s.

FIG. 17 through FIG. 22 show representative frames from example output videos of the imaging analysis code for a series of experiments using RFN-BOS techniques for each of different cladding types and lighting conditions. Two frames are shown for each temperature difference condition. The top images are outputs from the first stage of the optical flow algorithm and are called wiggle plots; they indicate the apparent shift of the background features due to the refractive fluid. The color indicates direction of the shift, and the brightness of the color indicates magnitude of the shift. The bottom images are quiver plots from the second stage of the analysis code. The arrows show the direction and velocity (according to the length of the arrow) of the refractive fluid. The analysis code computed velocity in pixels per frame. However, a known dimension in the image frame can be used to calculate the real velocity of the exfiltration. The brighter colors indicate a larger localized background shift (i.e., wiggle) due to the larger difference between the refractive index of the exfiltration and ambient air. This allows the algorithm that creates the quiver plot, which shows the movement of the exfiltration, to track the movement of these shifts more easily between frames.

Figure 17:
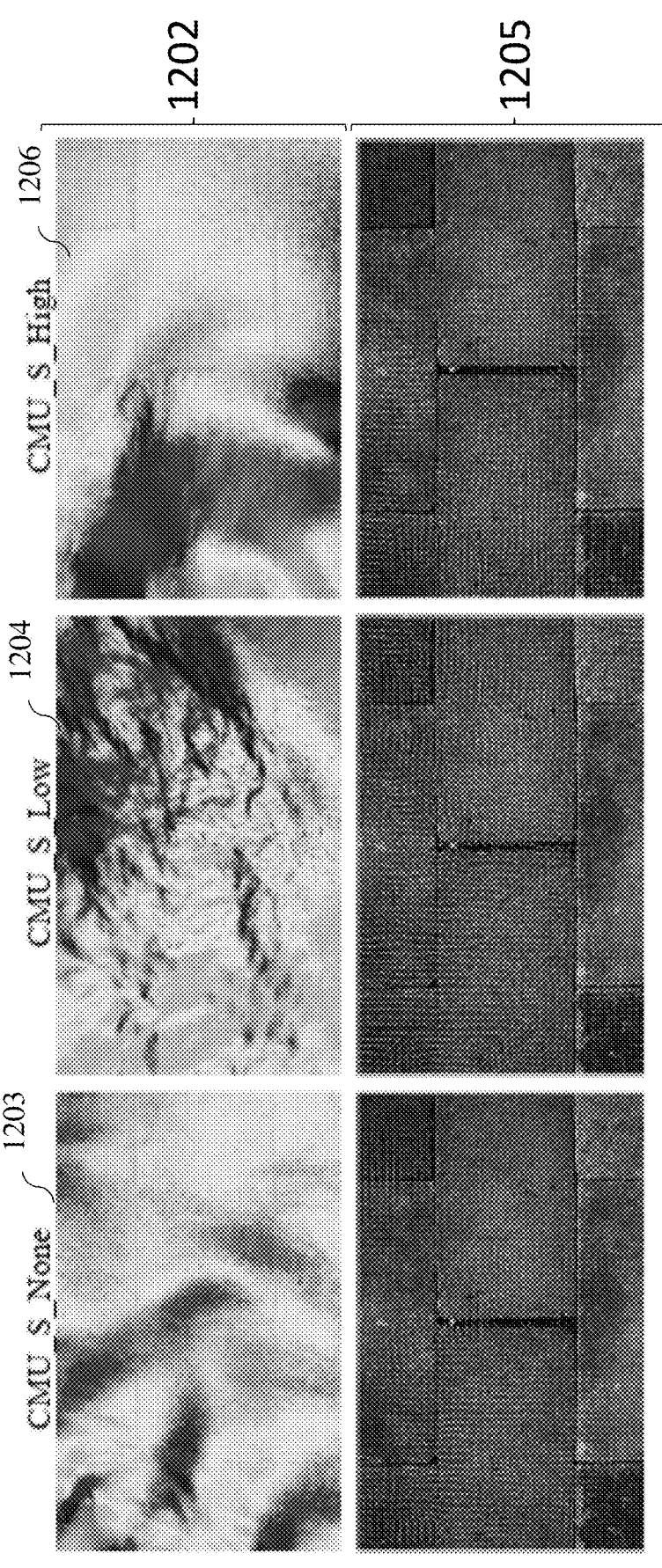
FIG. 17 through FIG. 22 show representative frames from example output videos of the imaging analysis code for a series of experiments using RFN-BOS techniques for each of different cladding types and lighting conditions in an illustrative embodiment.

FIG. 17 shows the visualization results of exfiltration through CMU cladding under sunny conditions including corresponding wiggle plots 1202 and corresponding quiver plots 1205. At 1203 background movement and air flow were detected for the no-flow condition, CMU_S_None. For these experiments, the cladding was heated by the sun, and the air 1 mm in front of the cladding was 12° C. warmer than the ambient air. This solar-heated air is likely what is imaged in the no-flow condition. The exfiltration was successfully visualized at 1204 for the low-$\Delta T$ condition and at 1206 for the high-$\Delta T$ conditions.

Figure 18:
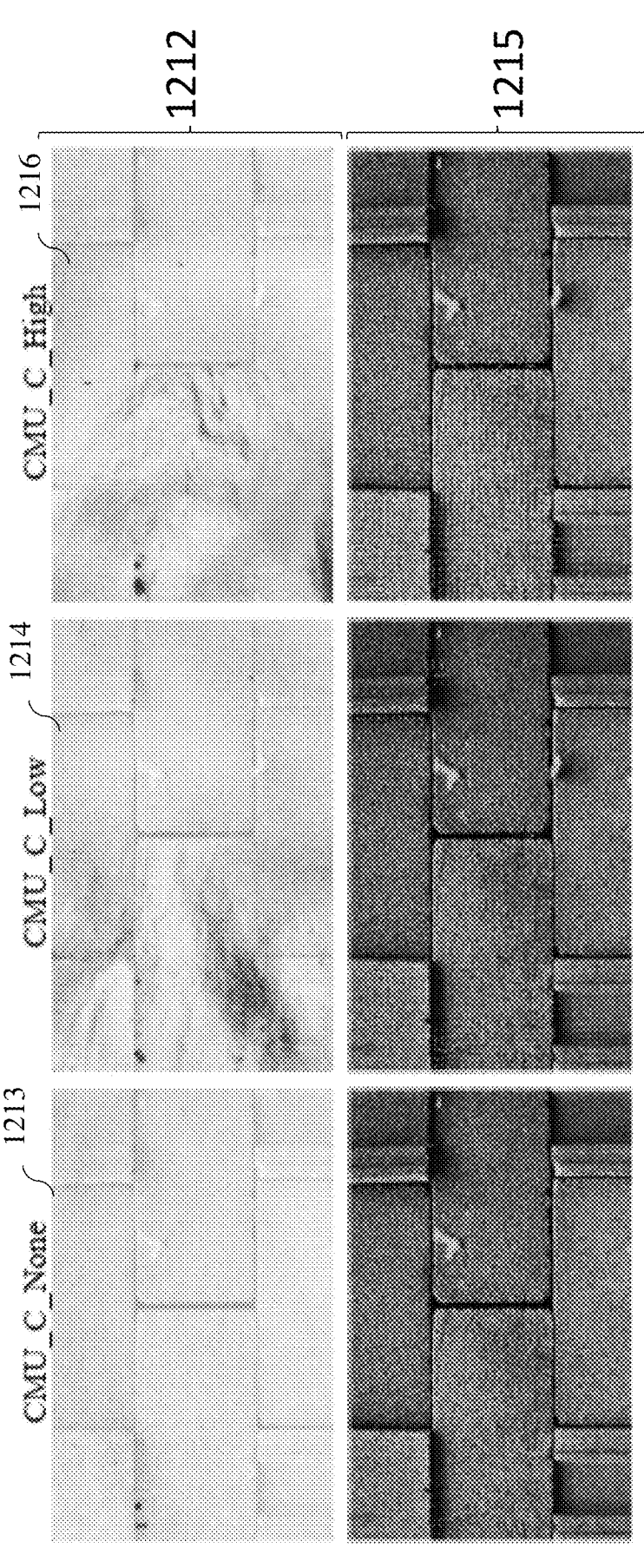

FIG. 18 displays the visualization results of exfiltration through CMU cladding under cloudy conditions including corresponding wiggle plots 1212 and corresponding quiver plots 1215. From left to right, conditions for visualization become more favorable as the temperature differential between exfiltration and outdoor air increases. At 1213, for the no-flow condition, no air was visualized because with cloudy skies, solar heating of the cladding did not occur. Visualization of the exfiltration with high $\Delta T$ was more pronounced (shown as brighter colors) at 1216 than with low $\Delta T$ as shown in the visualization 1214. This was expected since the high-$\Delta T$ exfiltration had a larger index of refraction change compared with the ambient air than the low-$\Delta T$ exfiltration. This difference causes the background to shift farther.

Figure 19:
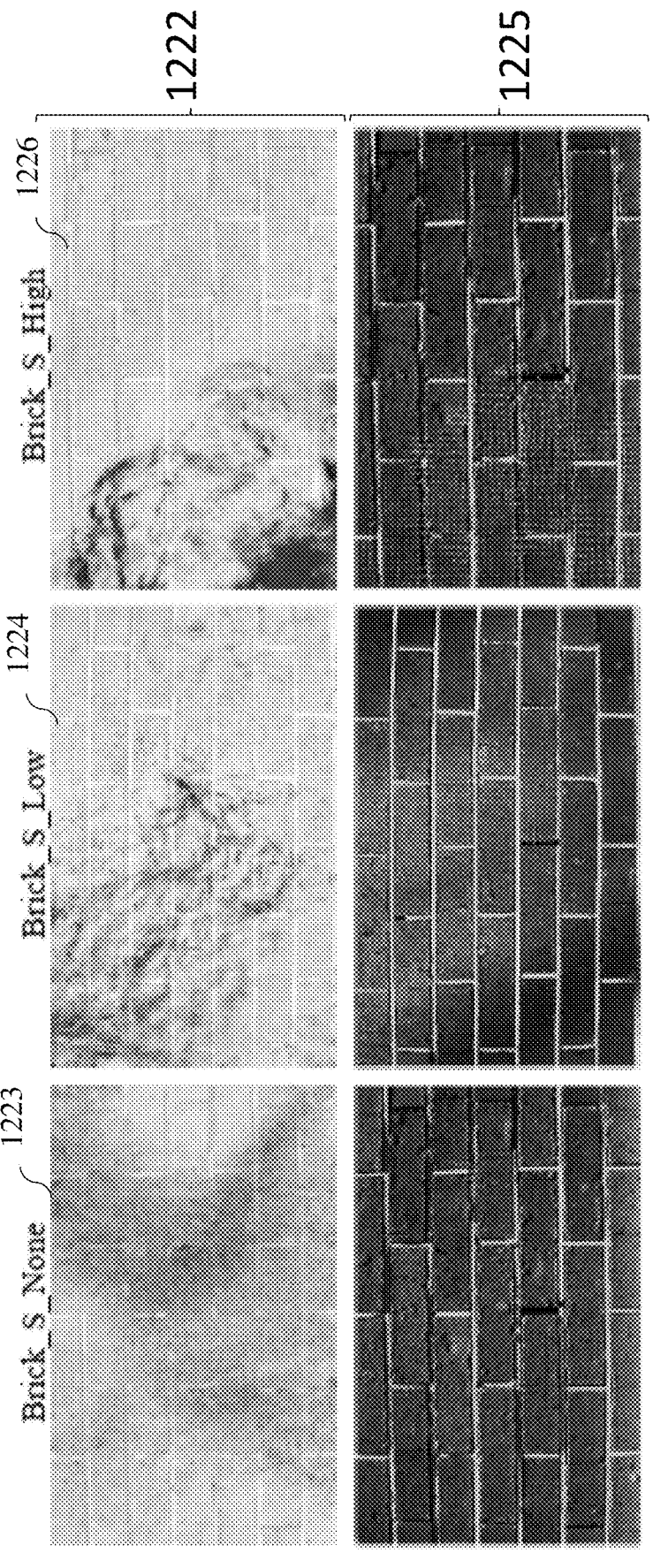

FIG. 19 shows the visualization results of exfiltration through brick cladding under sunny sky conditions including corresponding wiggle plots 1222 and corresponding quiver plots 1225. From left to right, conditions for visualization became more favorable as the temperature differential between exfiltration and outdoor air increased. At 1223, for the no-flow condition, a very weak visualization of air was observed. This could again be solar heating causing heated air to move along the cladding. Visualization of the exfiltration with low-$\Delta T$ conditions is shown at 1224 and at high-$\Delta T$ conditions at 1226, and the high-$\Delta T$ condition had larger background shifts (shown as brighter colors).

Figure 20:
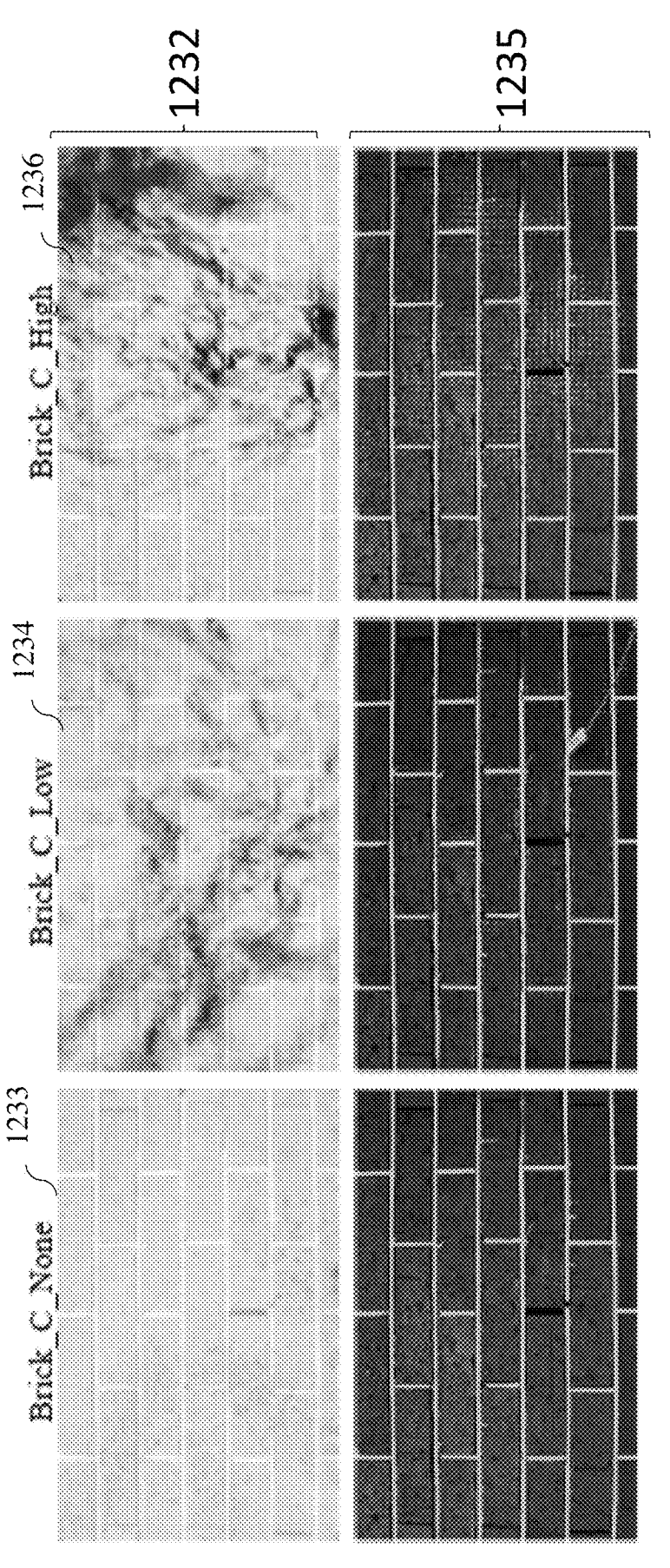

FIG. 20 displays the visualization results of exfiltration through brick cladding under cloudy sky conditions including corresponding wiggle plots 1232 and corresponding quiver plots 1235. From left to right, conditions for visualization became more favorable as the temperature differential between exfiltration and outdoor air increased. As shown at 1233, a no solar heating occurred, so no air movement was visualized in the no-flow condition. The low-$\Delta T$ and high-$\Delta T$ exfiltration were both visualized successfully at 1234 and 1236, respectively. The high-$\Delta T$ exfiltration was visualized with brighter colors, as expected. For the low-$\Delta T$ exfiltration, the quiver plot shows that the algorithm detects most of the flow around the areas of the image with the most contrast, which are located around the mortar joints between the bricks.

Figure 21:
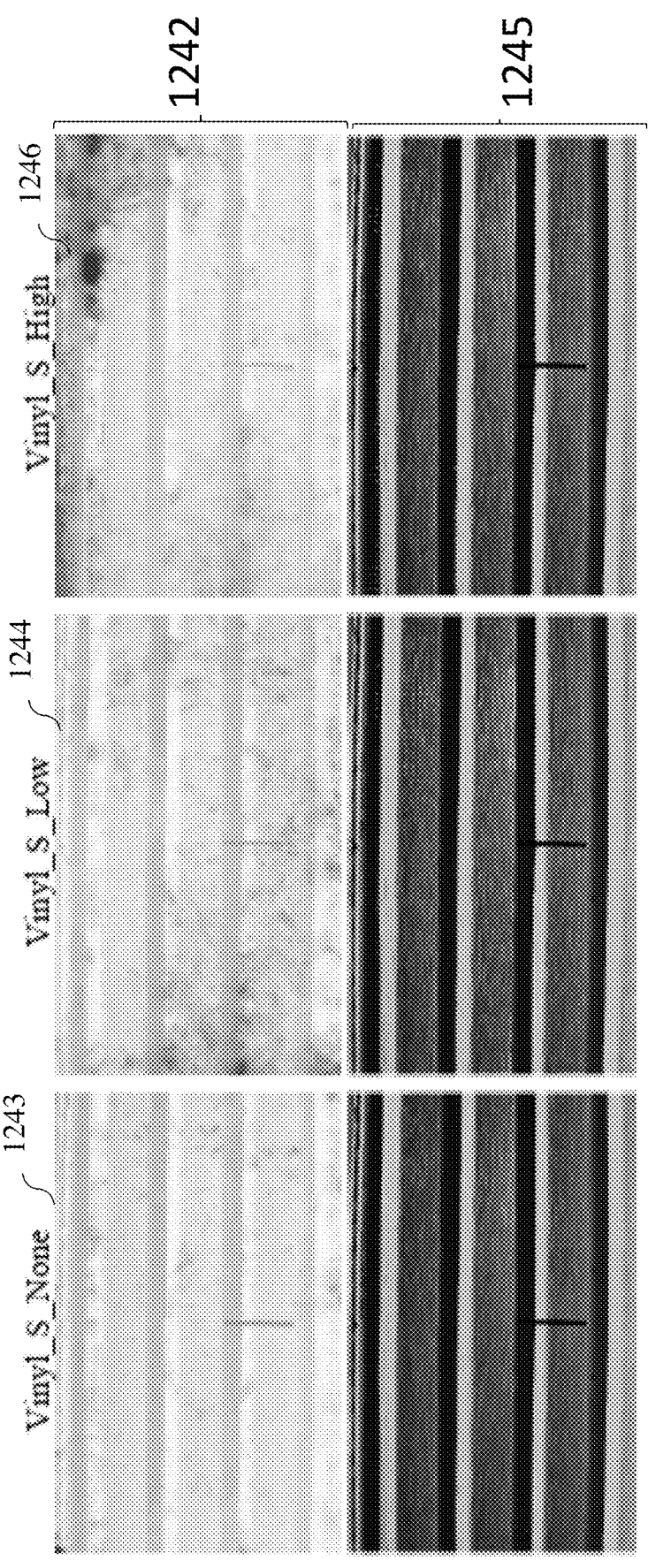

FIG. 21 displays the visualization results of exfiltration through white vinyl siding under sunny sky conditions including corresponding wiggle plots 1242 and corresponding quiver plots 1245. In these cases, any flow that was visualized was very weak. As shown at 1243, no air was visualized for the no-flow condition. For both the low-$\Delta T$ and high-$\Delta T$ conditions, some exfiltration was visualized at 1244 and 1246, respectively, but it was very weak and did not originate from the crack where the exfiltration flowed through, as shown in the quiver plots.

Figure 22:
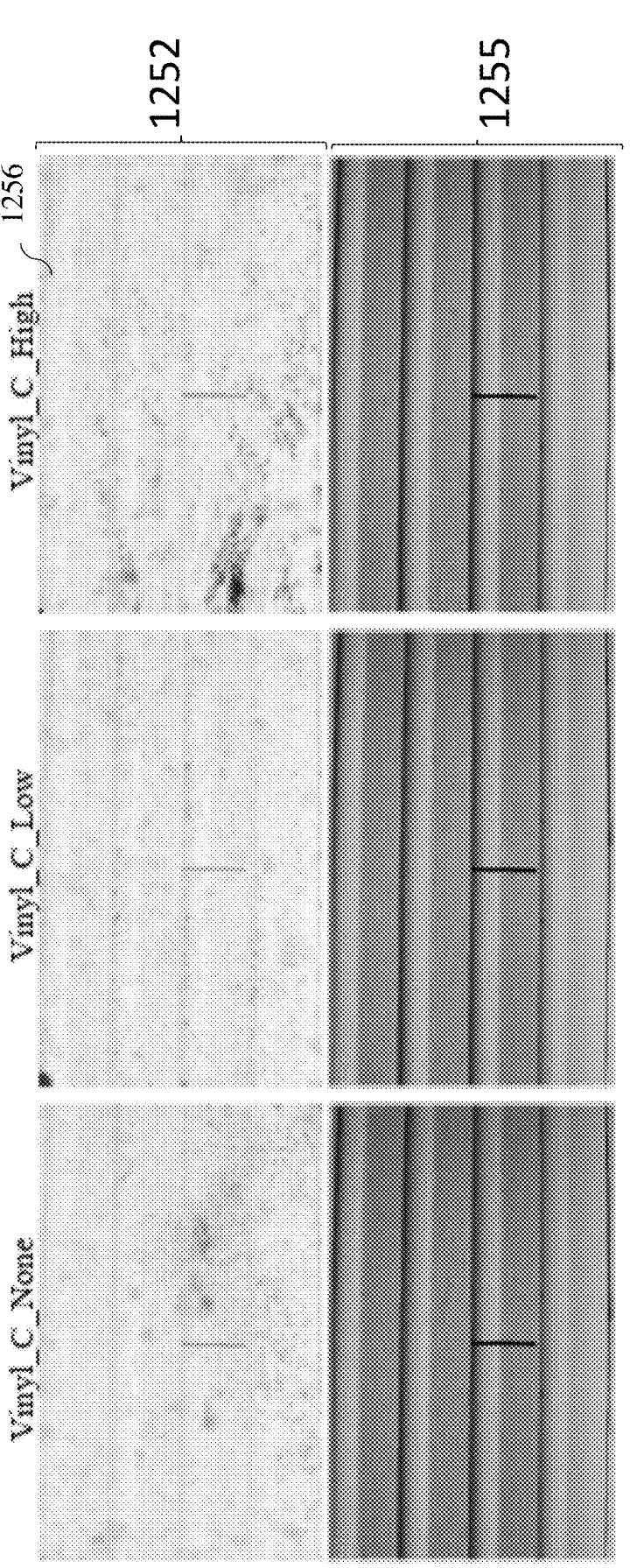

FIG. 22 displays the visualization results of exfiltration through white vinyl siding under cloudy sky conditions including corresponding wiggle plots 1252 and corresponding quiver plots 1255. Some flow was visualized in the high-$\Delta T$ case. The only condition in this set that showed any exfiltration visualization was the high-$\Delta T$ condition as shown at 1256. Even with high $\Delta T$, the visualization was very weak and did not originate at the crack where the exfiltration flowed through. It is the low contrast of the vinyl siding that hinders the RFN-BOS technique from visualizing the exfiltration clearly for this cladding. However, as demonstrated, a low contrast of certain wall claddings such as vinyl siding and even interior wall finishes such as drywall can be used with the RFN-BOS technique if the camera, optics, and lighting are set up to maximize the contrast of the textural features of the background or if a high-contrast pattern is projected on the cladding or interior surface.

In general, if a cladding has sufficient contrast and there is sufficient temperature difference between the exfiltration and ambient air, exfiltration can be successfully visualized, as demonstrated in FIG. 19 through FIG. 22. The RFNBOS method will better visualize exfiltration through claddings with higher contrast and that it can visualize exfiltration in front of a suitably textured background if the exfiltration air temperature is at least 5° C. different than the ambient air temperature. Further, the experimental results showed that exfiltration can be clearly visualized through CMU and brick claddings, which had a 5-pixel step contrast of 1,650 or greater in the vertical direction as shown in the table of FIG. 4.

An exfiltration through a building envelope is further visualized using RFN-BOS photography system of FIG. 3 if the background has sufficient texture and the temperature difference between the exfiltration and ambient air is sufficient. Exfiltration was detected when there was a temperature difference of 12° C.-15° C. through CMU and brick claddings. Note, however, that the minimum $\Delta T$ detection limit can be reduced to 5° C. so that the RFN-BOS technique can be used extensively through all climate zones. This can likely be done when a sufficiently textured cladding is used. A sufficiently textured cladding is one in which the contrast textural feature is at 1,650 or higher. If the natural cladding does not have sufficient texture, then a high-resolution pattern on the cladding is first projected.

Further, projected patterns enable BOS in environments with untextured backgrounds, such as home drywall or vinyl siding and relatively uniform and monochromatic (e.g., many industrial) sites. Projected patterns with tuned/optimized density and shape can enhance BOS sensitivity. Using non-visible and/or out-of-monitoring-band wavelengths for the projected patterns can enable stealth and unobtrusive BOC. Projected patterns enable BOC in nighttime and dark applications.

The RFN-BOS photography system of FIG. 3 couple with optical flow algorithms of FIG. 7 or FIG. 9 can be used generally in fields such as detectors and sensors, or energy and utilities. Specifically, the system and methods can be used for detection of benign and hazardous leaks from homes, industrial processes, pipelines, fueling stations, rail cars, transportation systems, steam-system and other heat and/or gas loss, etc. Also, the system and methods can be used for the following flow visualization studies: e.g., natural and forced convection to enhance heat transfer; propulsion and lift studies of wings, rotors and blades; exhaust detection from rockets and missiles, land, water and aircraft; industrial and consumer safety systems. The system and methods can be used for the unobtrusive and stealth monitoring for consumer, industrial and military applications.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electromagnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The processor(s) described herein, e.g., a hardware processor, may be a central processing unit (CPU), a graphics processing unit (GPU), a field programmable gate array (FPGA), an application specific integrated circuit (ASIC), another suitable processing component or device, or one or more combinations thereof. The storage(s) may include random access memory (RAM), read-only memory (ROM) or another memory device, and may store data and/or processor instructions for implementing various functionalities associated with the methods and/or systems described herein.

In the description and claims herein, the term "about" indicates that the value listed may be somewhat altered, as long as the alteration does not result in nonconformance of the process or device. For example, for some elements the term "about" can refer to a variation of ±0.1% for other elements, the term "about" can refer to a variation of ±1% or ±10%, or any point therein. For example, the term about when used for a measurement in m, may include +/0.1, 0.2, 0.3, etc., where the difference between the stated number may be larger when the state number is larger. For example, about 1.5 may include 1.2-1.8, where about 20, may include 19.0-21.0.

The terminology used herein is for the purpose of describing particular aspects only and is not intended to be limiting the scope of the disclosure and is not intended to be exhaustive. Many modifications and variations will be apparent to those of ordinary skill in the art without departing from the scope and spirit of the disclosure.

What is claimed is:

1. A system for detecting leaks at a surface of a building structure, the system comprising:

a video camera disposed at a predetermined distance from a surface of the building structure, the video camera capturing images of a surface of the building structure; and a hardware processor associated with a memory storing program instructions in a computer system, the hardware processor running the program instructions configuring the processor to:

detect, from said received image information, differences in light intensity at corresponding pixel locations in successive image frames;

provide a visualization of an air flow movement based on detected differences in light intensities at the corresponding pixel locations in successive images;

identify and isolate one or more regions of interest within said air flow visualization, a region of interest (ROI) corresponding to a location indicating a potential leak at the surface of the structure;

obtain one or more flow parameters characterizing the air flow movement within said ROI; and identify, based on said obtained one or more flow parameters, a location and magnitude of said potential leak at the surface of the building structure.

2. The system as claimed in claim 1, wherein said one or more flow parameters comprises:

a pixel-shift parameter representing a refractive-feature displacement obtained based on a cross correlation computation of the air flow movement in sequential difference images of said captured images.

3. The system as claimed in claim 2, wherein said air flow movement is an air turbulence, said hardware processor is further configured to:

identify a plume region corresponding to said air turbulence, said plume region corresponding to a diameter of the leak; and estimate a cross-sectional area bound of the plume region.

4. The system as claimed in claim 3, wherein said hardware processor is further configured to compute an air flow velocity based on said obtained refractive-feature displacement, said one or more flow parameters comprise:

a volumetric flow rate parameter (Q) obtained based on a multiplication of the obtained computed air flow velocity with the estimated cross-sectional area bound of the plume region.

5. The system as claimed in claim 2, wherein said air flow movement is an air fluctuation, said hardware processor is further configured to:

identify a plume region corresponding to said air fluctuation, said plume region corresponding to a diameter of the potential leak; and estimate a cross-sectional area bound of the plume region.

6. The system as claimed in claim 1, wherein said visualization of the air flow movement is based on applying a background oriented Schlieren photographic technique.

7. The system as claimed in claim 1, further comprising:

an image projection sub-system for projecting a high contrast image upon the building surface prior to the video camera capturing images of the surface, said projected image pattern increasing the apparent texture of the surface.

8. The system as claimed in claim 7, wherein said image projection sub-system for projecting said high contrast image comprises a high resolution projector, said projected high contrast image comprising one of: a random dot pattern or linear pattern upon the low contrast material surface.

9. The system as claimed in claim 7, wherein said image projection sub-system for projecting said high contrast image comprises a coherent laser light source with diffracting optics or pattern-generating optics or reticles, wherein coherent laser light is diffused to provide one or more of: a speckle pattern, a dot pattern or a shaped pattern upon the low contrast material surface.

10. The system as claimed in claim 7, wherein said image projection sub-system for projecting said high contrast image comprises a high powered light source with pattern-generating optics for producing one or more of: a random dot pattern, a dot pattern, a linear pattern or a shaped pattern upon the low contrast material surface.

11. The system as claimed in claim 1, wherein to isolate one or more regions of interest within said air flow visualization, the hardware processor is further configured to:

perform an image segmentation technique from said received image information.

12. A computer program product for detecting leaks at a surface of a building structure, the computer program product comprising a non-transitory computer readable storage medium having program instructions embodied therewith, the program instructions executable by a processor device to cause the device to:

receive image information from a sequence of images, said sequence of images being captured from a video camera disposed at a predetermined distance from a surface of the building structure;

detect, from said received image information, differences in light intensity at corresponding pixel locations in successive image frames;

provide a visualization of an air flow movement based on detected differences in light intensities at the corresponding pixel locations in successive images;

identify and isolate one or more regions of interest within said air flow visualization, a region of interest (ROI) corresponding to a location indicating a potential leak at the surface of the structure;

obtain one or more flow parameters characterizing the air flow movement within said ROI; and identify, based on said obtained one or more flow parameters, a location and magnitude of said potential leak at the surface of the building structure.

13. The computer program product as claimed in claim 12, wherein said one or more flow parameters comprises:

a pixel-shift parameter representing a refractive-feature displacement obtained based on a cross correlation computation of the air flow movement in sequential difference images of said captured images.

14. The computer program product as claimed in claim 13, wherein said air flow movement is an air turbulence, said program instructions further configuring the processor device to:

identify a plume region corresponding to said air turbulence, said plume region corresponding to a diameter of the leak.

15. The computer program product as claimed in claim 13, wherein said air flow movement is an air fluctuation, said program instructions further configure the processor device to:

identify a plume region corresponding to said air fluctuation, said plume region corresponding to a diameter of the leak; and estimate a cross-sectional area bound of the plume region.

16. The computer program product as claimed in claim 13, wherein said program instructions further configure the processor device to compute an air flow velocity based on said obtained refractive-feature displacement, said one or more flow parameters comprise:

a volumetric flow rate parameter (Q) obtained based on a multiplication of the computed air flow velocity with the estimated cross-sectional area bound of the plume region.

17. The computer program product as claimed in claim 12, wherein to isolate one or more regions of interest within said air flow visualization, said program instructions further configure the processor device to:

perform an image segmentation technique from said received image information.

18. A method of detecting leaks at a surface of a building structure, the method comprising:

capturing, from a video camera device, a sequence of images, said video camera device disposed at a predetermined distance from a surface of the building structure;

detecting, from said received image information, using a hardware processor, differences in light intensity at corresponding pixel locations in successive image frames;

providing, using the hardware processor, a visualization of an air flow movement based on detected differences in light intensities at the corresponding pixel locations in successive images;

identifying and isolating, using the hardware processor, one or more regions of interest within said air flow visualization, a region of interest (ROI) corresponding to a location indicating a potential leak at the surface of the structure;

obtaining, using the hardware processor, one or more flow parameters characterizing the air flow movement within said ROI; and identifying, based on said obtained one or more flow parameters, a location and magnitude of said potential leak at the surface of the building structure.

19. The method as claimed in claim 18, wherein said one or more flow parameters comprises:

a pixel-shift parameter representing a refractive-feature displacement obtained based on a cross correlation computation of the air flow movement in sequential difference images of said captured images.

20. The method as claimed in claim 19, wherein said air flow movement is an air turbulence, said method further comprising:

identifying, using the hardware processor, a plume region corresponding to said air turbulence, said plume region corresponding to a diameter of the leak.

21. The method as claimed in claim 20, wherein said air flow movement is an air fluctuation, said method further comprising:

identifying, using the hardware processor, a plume region corresponding to said air fluctuation, said plume region corresponding to a diameter of the leak; and estimating a cross-sectional area bound of the plume region.

22. The method as claimed in claim 19, further comprising:

computing, using the hardware processor, an air flow velocity based on said obtained refractive-feature displacement, wherein said one or more flow parameters comprise:

a volumetric flow rate parameter (Q) obtained based on a multiplication of the computed air flow velocity with the estimated cross-sectional area bound of the plume region.

23. The method as claimed in claim 18, further comprising:

detecting, using the hardware processor, a contrast level associated with a material surface of said building structure, comparing said associated contrast level against a threshold contrast level, and responsive to detecting said associated contrast level below the threshold contrast level, projecting, using an image projection sub-system, a high-contrasting image pattern upon the surface prior to the video camera capturing images of the surface.

24. The method as claimed in claim 23, wherein said projected high-contrasting image pattern comprises one or more of: a speckle pattern, a random dot pattern, a dot pattern, a linear pattern, or a shaped pattern upon the low contrast material surface.

25. The method as claimed in claim 18, wherein to isolate one or more regions of interest within said air flow visualization, said method further comprises:

performing, using the hardware processor, an image segmentation technique from said received image information.

26. A method for prioritizing a sealing of leaks at a surface of a building structure, the method comprising:

capturing, from a video camera device, a sequence of images at a predetermined area of the surface of the building structure;

processing the captured sequence of images to detect an air flow movement indicating a leak at the predetermined area of the surface of the building structure;

for each detected air flow movement indicating a leak, determining a corresponding leak-ranking parameter of each air flow movement at the predetermined area;

repeating said projecting, capturing, air flow movement detection processing, and corresponding leak-ranking parameter determining for each detected air flow movement at each of a plurality of different predetermine areas of the surface;

determining, based on said leak-ranking parameters for all detected air flow movements at different predetermined areas, corresponding leaks having a largest corresponding leak-ranking parameter or volumetric flow rate and successively smaller leak-ranking parameters or volumetric flow rates; and prioritizing actions to seal leaks at locations at the surface in an order corresponding to leaks having the largest corresponding leak-ranking parameter or volumetric flow rate and successively smaller leak-ranking parameters or volumetric flow rates.

27. The method as claimed in claim 26, wherein the processing the captured sequence of images to detect an air flow movement indicating a leak at the predetermined area of the surface of the building structure comprises:

receiving, at a hardware processor, image information from said captured image sequence and processing the image information to:

detect from said received image information, differences in light intensity at corresponding pixel locations in successive image frames;

provide a visualization of the air flow movement based on detected differences in light intensities at the corresponding pixel locations in successive images;

identify and isolate one or more regions of interest within said air flow visualization, a region of interest (ROI) corresponding to a location indicating a potential leak at the surface of the structure;

obtain one or more flow parameters characterizing the air flow movement within said ROI; and identify, based on said obtained one or more flow parameters, a location and magnitude of said potential leak at the surface of the building structure.

28. The method as claimed in claim 27, wherein said one or more flow parameters comprises:

a pixel-shift parameter representing a refractive-feature displacement obtained based on a cross correlation computation of the air flow movement in sequential difference images of said captured images.

29. The method as claimed in claim 28, wherein said air flow movement comprises an air turbulence, said method further comprising:

identifying, using the processor device, a plume region corresponding to said air turbulence, said plume region corresponding to a velocity of the leak.

30. The method as claimed in claim 18, wherein said air flow movement comprises an air fluctuation, said method further comprising:

identifying, using the hardware processor, a plume region corresponding to said air fluctuation, said plume region corresponding to a diameter of the leak; and estimating a cross-sectional area bound of the plume region.

31. The method as claimed in claim 30, further comprising:

computing an air flow velocity based on said obtained refractive-feature displacement, wherein said one or more flow parameters comprise:

a volumetric flow rate parameter (Q) obtained based on a multiplication of the computed air flow velocity with the estimated cross-sectional area bound of the plume region.

32. The method as claimed in claim 26, wherein said processing the captured sequence of images to detect the air flow movement indicating a leak at the predetermined area of the surface of the building structure comprises:

applying a Background Oriented Schlieren (BOS) photographic technique.

\* \* \* \* \*